(12) United States Patent
Ono et al.

(10) Patent No.: US 9,670,622 B2
(45) Date of Patent: Jun. 6, 2017

(54) MULTILAYERED STRUCTURE COMPRISING FINE FIBER CELLULOSE LAYER

(71) Applicant: ASAHI KASEI FIBERS CORPORATION, Osaki-shi, Osaka (JP)

(72) Inventors: Hirofumi Ono, Tokyo (JP); Shuji Takasu, Tokyo (JP); Atsushi Horii, Tokyo (JP); Satoru Yoshida, Tokyo (JP)

(73) Assignee: ASAHI KASEI FIBERS CORPORATION, Osaka-Shi (JP)

( * ) Notice: Subject to any disclaimer, the term of this patent is extended or adjusted under 35 U.S.C. 154(b) by 0 days.

(21) Appl. No.: 15/066,933

(22) Filed: Mar. 10, 2016

(65) Prior Publication Data

US 2016/0194832 A1 Jul. 7, 2016

Related U.S. Application Data

(62) Division of application No. 14/414,569, filed as application No. PCT/JP2013/069685 on Jul. 19, 2013.

(30) Foreign Application Priority Data

Jul. 19, 2012 (JP) ................................ 2012-160877

(51) Int. Cl.
*D21H 27/38* (2006.01)
*D21H 27/30* (2006.01)
(Continued)

(52) U.S. Cl.
CPC ............ *D21H 27/38* (2013.01); *B32B 5/022* (2013.01); *B32B 5/22* (2013.01); *B32B 5/24* (2013.01);
(Continued)

(58) Field of Classification Search
CPC ........ D21H 15/02; D21H 11/18; D21H 11/12; D21H 13/08; D21H 13/14; D21H 13/24;
(Continued)

(56) References Cited

U.S. PATENT DOCUMENTS 6,074,523 A * 6/2000 Mizobuchi .............. D21F 11/14
 1/14
8,383,529 B2 * 2/2013 Ono ........................ B01D 39/18
 162/1

(Continued)

FOREIGN PATENT DOCUMENTS

DE  102 45 125 A1  1/2004
EP  1 769 836 A1  4/2007
(Continued)

OTHER PUBLICATIONS

International Search Report issued by the Japanese Patent Office in corresponding International Application No. PCT/JP2013/069685, mailed Oct. 22, 2013 (5 pages).
(Continued)

*Primary Examiner* — Jose Fortuna
(74) *Attorney, Agent, or Firm* — Finnegan, Henderson, Farabow, Garrett & Dunner, L.L.P.

(57) ABSTRACT

Provided is a multilayered structure comprising at least one fine cellulose fiber nonwoven fabric layer made of a fine cellulose fiber, wherein the multilayered structure is characterized in that the mean fiber diameter of the fine cellulose fiber forming the fine cellulose fiber non-woven fabric layer is 0.005 to 0.5 μm, and the mean thickness of the multilayered structure is 10 to 200 μm, the density thereof is 0.10 to 0.90 g/cm³, and the permeability resistance thereof is 2000 s/100 ml or more. Also provided are an energy recovery ventilation sheet made of this multilayered structure, an energy recovery ventilation element using this energy recovery ventilation sheet as a partitioning material for partition-
(Continued)

Crossflow type

Counterflow type ing two types of air flow of different temperature and/or humidity, and a energy recovery ventilator using this energy recovery ventilation element.

13 Claims, 2 Drawing Sheets

(51) Int. Cl.

| | | |
|---|---|---|
| *B32B 29/02* | (2006.01) | |
| *F28F 3/00* | (2006.01) | |
| *D21H 11/18* | (2006.01) | |
| *D21H 13/08* | (2006.01) | |
| *D21H 13/14* | (2006.01) | |
| *D21H 13/24* | (2006.01) | |
| *D21H 13/26* | (2006.01) | |
| *D21H 15/02* | (2006.01) | |
| *F28F 21/00* | (2006.01) | |
| *F24F 12/00* | (2006.01) | |
| *F28D 9/00* | (2006.01) | |
| *F28D 21/00* | (2006.01) | |
| *B32B 5/02* | (2006.01) | |
| *B32B 5/22* | (2006.01) | |
| *B32B 5/24* | (2006.01) | |
| *B32B 5/26* | (2006.01) | |
| *B32B 29/00* | (2006.01) | |
| *B32B 37/24* | (2006.01) | |
| *D21H 11/12* | (2006.01) | |
| *D21H 21/16* | (2006.01) | |
| *D21H 21/34* | (2006.01) | |

(52) U.S. Cl.
CPC .............. *B32B 5/26* (2013.01); *B32B 29/002* (2013.01); *B32B 29/02* (2013.01); *B32B 37/24* (2013.01); *D21H 11/12* (2013.01); *D21H 11/18* (2013.01); *D21H 13/08* (2013.01); *D21H 13/14* (2013.01); *D21H 13/24* (2013.01); *D21H 13/26* (2013.01); *D21H 15/02* (2013.01); *D21H 21/16* (2013.01); *D21H 21/34* (2013.01); *D21H 27/30* (2013.01); *F24F 12/006* (2013.01); *F28D 9/00* (2013.01); *F28D 21/0014* (2013.01); *F28D 21/0015* (2013.01); *F28F 3/00* (2013.01); *F28F 21/00* (2013.01); *B32B 2255/02* (2013.01); *B32B 2262/0253* (2013.01); *B32B 2262/0261* (2013.01); *B32B 2262/0276* (2013.01); *B32B 2262/04* (2013.01); *B32B 2262/062* (2013.01); *B32B 2307/3065* (2013.01); *B32B 2307/72* (2013.01); *B32B 2307/728* (2013.01); *B32B 2307/7242* (2013.01); *B32B 2307/73* (2013.01); *B32B 2419/00* (2013.01); *Y02B 30/563* (2013.01); *Y02P 70/24* (2015.11)

(58) Field of Classification Search
CPC ........ D21H 13/26; D21H 21/16; D21H 27/30; D21H 27/38; D21H 13/02; D21H 17/25; D21H 27/08; B32B 2262/0253; B32B 2262/0261; B32B 2262/0276; B32B 2262/04; B32B 2262/062; B32B 2307/72; B32B 2307/728; B32B 29/02; B32B 37/24; B32B 5/022; B32B 5/22; B32B 5/24; B32B 5/26; Y02B 30/563; F28F 3/00; F28F 21/00; F24F 12/006; F28D 9/00; F28D 21/0014

See application file for complete search history.

(56) References Cited

U.S. PATENT DOCUMENTS

| | | | |
|---|---|---|---|
| 8,663,426 B2 * | 3/2014 | Fujiwara ............ | B01D 67/0004 139/383 R |
| 2003/0226656 A1 | 12/2003 | Harada et al. | |
| 2004/0255783 A1 | 12/2004 | Graham et al. | |
| 2007/0207692 A1 * | 9/2007 | Ono ........................ | B01D 39/18 442/327 |
| 2009/0068437 A1 | 3/2009 | Miyagoshi et al. | |
| 2011/0186252 A1 * | 8/2011 | Subramanian ......... | D21H 17/70 162/128 |
| 2012/0298319 A1 * | 11/2012 | Fujiwara ............ | B01D 67/0004 162/100 |
| 2013/0017394 A1 * | 1/2013 | Hua ........................ | D21D 1/20 428/401 |
| 2015/0068973 A1 * | 3/2015 | Bessonoff .............. | B01D 39/18 210/500.29 |
| 2015/0167249 A1 * | 6/2015 | Ono ........................ | B32B 29/02 162/130 |
| 2016/0016717 A1 * | 1/2016 | Toubeau ............ | B01D 39/1607 220/62.13 |
| 2016/0023146 A1 * | 1/2016 | Hampton ............... | D04H 1/425 210/510.1 |
| 2016/0130757 A1 * | 5/2016 | Mikami .................. | D21F 5/048 162/207 |
| 2016/0177512 A1 * | 6/2016 | Kawahara ............... | B32B 23/08 435/289.1 |
| 2016/0194832 A1 * | 7/2016 | Ono ........................ | B32B 29/02 428/220 |

FOREIGN PATENT DOCUMENTS

| | | | | |
|---|---|---|---|---|
| FI | EP 2781652 A1 * | 9/2014 | ............ | D21H 11/18 |
| JP | 06-194093 | 7/1994 | | |
| JP | 11-189999 | 7/1999 | | |
| JP | 2003-287387 | 10/2003 | | |
| JP | 2008-14623 | 1/2008 | | |
| JP | 2008-088589 | 4/2008 | | |
| JP | 2010-53461 | 3/2010 | | |
| JP | 2010-115574 | 5/2010 | | |
| JP | 2011-74535 | 4/2011 | | |
| JP | 2012036529 A * | 2/2012 | | |
| JP | 2012-160877 | 8/2012 | | |
| JP | 2012167406 A * | 9/2012 | | |
| JP | EP 1769836 B1 * | 10/2013 | ............ | B01D 39/18 |
| JP | EP 2875950 A1 * | 5/2015 | ............ | B32B 29/02 |
| WO | WO 02/099193 | 12/2002 | | |
| WO | WO 2010/044169 A1 | 4/2010 | | |

OTHER PUBLICATIONS

Written Opinion and International Preliminary Report on Patentability issued by The International Bureau of WIPO in corresponding International Application No. PCT/JP2013/069685, mailed Oct. 22, 2013 (10 pages).
Database WPI Week 201036 XP-002740293 (2010).
Supplementary European Search Report for EP 13 82 0013 dated Jun. 12, 2015.

* cited by examiner

Crossflow type

Counterflow type

Fine cellulose fiber nonwoven fabric layer

Support layer

MULTILAYERED STRUCTURE COMPRISING FINE FIBER CELLULOSE LAYER

This is a division of application Ser. No. 14/414,569, §371(c) date of Jan. 13, 2015, which is the National Stage of PCT/JP2013/069685, filed Jul. 17, 2013, all of which are incorporated herein by reference.

TECHNICAL FIELD

The present invention relates to a multilayered structure comprising at least one fine cellulose fiber nonwoven fabric layer, an energy recovery ventilation sheet composed of the multilayer structure, an energy recovery ventilation element that uses the energy recovery ventilation sheet as a partitioning material that partitions two types of air flow of different temperature, different humidity or both, and an energy recovery ventilator that uses the energy recovery ventilation element.

BACKGROUND ART

Air-conditioning equipment accounts for the largest proportion of energy consumed by ordinary office buildings and other architectural structures (approximately 38%). Since 30% to 40% of that amount cannot be ventilated from the outside, reducing the loss of air-conditioning energy attributable to ventilation can be said to be an important issue for conserving energy in office buildings. In addition, so-called "sick house syndrome", which is caused by volatile organic compounds dissipated by building materials, household items and the like, is also becoming a problem. Examples of the causes of these problems include increased airtightness of buildings, increased difficulty in circulating air due to the proliferation of air-conditioners, and ease of accumulation of volatile organic compounds within buildings. In view of these circumstances, buildings in Japan are required to install ventilation equipment in accordance with the revised Building Standards Act enacted in July 2003. In addition, attempts have also been made to add ventilation functions to home air-conditioners, and such efforts have not been limited to Japan, with ventilation of buildings being promoted worldwide.

However, when attempts are made to promote building ventilation, it becomes difficult to maintain building heating even if air-conditioning is employed, thereby resulting in excessively high energy consumption. Consequently, attention is being focused on total heat exchangers that are capable of reducing energy consumption by making it difficult for heat or cold to be released to the outside even if ventilation is employed.

Examples of these energy recovery ventilators include rotary-type energy recovery ventilators that recover heat from exhaust air to intake air by the rotation of a hygroscopic rotor, and a static-type energy recovery ventilators as shown in FIG. 1. In this static-type (fixed-type) energy recovery ventilators, a gas-impermeable energy recovery ventilation element arranged in a corrugated shape allows sensible heat to migrate while dividing into fresh outside supplied air that has been exchanged by ventilation and contaminated interior discharged air, while simultaneously allowing latent heat retaining water to pass from the discharged air to the supplied air by allowing permeation of humidity, thereby reducing the release of heat or cold to the outside.

Since energy recovery ventilation sheets used in the energy recovery ventilation elements of static-type energy recovery ventilator not only allow the migration of sensible heat, but also allow the migration of latent heat by allowing the passage of moist air, energy recovery effectiveness increases. Examples of such sheets include energy recovery ventilation sheets using flame retardant paper made of Japanese paper or pulp, glass fiber mixed paper, inorganic powder-containing mixed paper, and microporous film, paper and nonwoven fabric composed of synthetic polymers. However, since air also ends up penetrating the sheet in the case of using ordinary microporous film, paper or nonwoven fabric, energy recovery ventilation sheets have been reported that have undergone surface treatment such as applying a polymer coating to the surface thereof. For example, Patent Document 1 (Japanese Unexamined Patent Publication No. H6-194093) reports an energy recovery ventilation sheet obtained by coating a polyurethane-based resin containing oxyethylene groups onto a porous sheet that uses polytetrafluoroethylene for the material thereof, while Patent Document 2 (Japanese Unexamined Patent Publication No. 2003-287387) reports an energy recovery ventilation sheet composed of polyester and polyethylene or polypropylene. In both these cases, since a hydrophobic polymer is used for the base material, adequate moisture permeability is unable to be obtained, and as a result thereof, sufficient thermal conductivity is unable to be obtained for use as an energy recovery ventilation sheet.

Patent Document 3 (Japanese Unexamined Patent Publication No. 2008-14623) describes an energy recovery ventilation filter obtained by coating viscose onto hydrophilic fibers in the form of a rayon pulp nonwoven fabric. Coating with hydrophilic rayon fibers is reported to allow the production of a sheet having moisture permeability of 6900 $g/m^2/24$ hours or more and a permeability resistance of 10000 s/100 ml or more. However, due to the inadequate moisture permeability, sufficient performance for use as an energy recovery ventilation sheet is unable to be obtained.

On the other hand, the inventors of the present invention reported a nonwoven fabric structure containing a layer of fine cellulose composed of fine cellulose fibers in Patent Document 4 (Japanese Unexamined Patent Publication No. 2010-115574). However, the multilayered nonwoven fabric structure described in Patent Document 4 (Japanese Unexamined Patent Publication No. 2010-115574) was not suitable for use as an energy recovery ventilation sheet due to high air permeability (permeability resistance of 2000 s/100 ml or less).

DISCLOSURE OF THE INVENTION

Problems to be Solved by the Invention

A problem to be solved by the present invention is to provide a multilayered structure having large air permeability resistance and high moisture permeability that is highly suitable for use as an energy recovery ventilation sheet.

Means for Solving the Problems

As a result of focusing on the fact that a fine cellulose fiber nonwoven fabric contained in a multilayered nonwoven fabric structure has an extremely small fiber diameter, proceeding with studies on the formation of a uniformly dense and thin layer having a low basis weight by utilizing the property of a prominent increase in density resulting from laminating according to a papermaking method from an aqueous dispersion followed by drying and shrinking in the direction of thickness during drying, and further conducting extensive studies to solve the aforementioned problems, the inventors of the present invention achieved the providing of a multilayered structure in the form of a sheet material able to not only be used as an energy recovery ventilation sheet, but also used in a wide range of application fields requiring both high permeability resistance and high moisture permeability, thereby leading to completion of the present invention.

Namely, the present invention is as described below.

[1] A multilayered structure comprising at least one fine cellulose fiber nonwoven fabric layer composed of fine cellulose fibers, wherein said fine cellulose fibers that form the fine cellulose fiber nonwoven fabric layer have a mean fiber diameter of 0.005 µm to 0.5 µm, and said multilayered structure has a mean thickness of 10 µm to 200 µm, a density of 0.10 g/cm³ to 0.90 g/cm³, and a permeability resistance of 2000 s/100 ml or more.

[2] The multilayered structure described in [1] above, which is a two-layer structure, the mean thickness of the multilayered structure is 10 µm to 150 µm, the density is 0.30 g/cm³ to 0.80 g/cm³ and the permeability resistance is 3000 s/100 ml or more.

[3] The multilayered structure described in [1] or [2] above, wherein the proportion of fine cellulose fibers contained in the fine cellulose fiber nonwoven fabric layer is 50% by weight to 100% by weight.

[4] The multilayered structure described in any of [1] to [3] above, wherein the total sum of the basis weight of the fine cellulose fiber nonwoven fabric layer is 1 g/m² to 15 g/m² and the total sum of the thickness is 0.5 µm to 15 µm.

[5] The multilayered structure described in any of [1] to [4] above, wherein one layer of the multilayered structure is a nonwoven fabric layer and/or porous film and/or fabric composed of one or a combination of a plurality of fibers selected from the group consisting of regenerated cellulose fibers, natural cellulose fibers, nylon fibers, polyester fibers and polyolefin fibers.

[6] The multilayered structure described in any of [1] to [4] above, wherein one layer of the multilayered structure is a nonwoven fabric layer composed of regenerated cellulose continuous long fibers.

[7] The multilayered structure described in any of [1] to [6] above, wherein the multilayered structure has been subjected to waterproofing treatment.

[8] The multilayered structure described in any of [1] to [7] above, wherein the multilayered structure has been subjected to hydrophilic treatment.

[9] An energy recovery ventilation sheet composed of the multilayered structure described in any of [1] to [8] above.

[10] The energy recovery ventilation sheet described in [9] above, wherein the mean thickness of the multilayered structure is 10 µm to 70 µm.

[11] The energy recovery ventilation sheet described in [10] above, wherein the mean thickness of the multilayered structure is 10 µm to 30 µm.

[12] The energy recovery ventilation sheet described in any of [9] to [11] above, wherein the multilayered structure has been subjected to flame retardation treatment.

[13] The energy recovery ventilation sheet described in any of [9] to [12] above, wherein the proportion of cellulose fibers in the material that composes the multilayered structure is 90% by weight or more.

[14] A method for producing the multilayered structure described in any of [1] to [6] above, comprising the following steps:

a step for laminating and forming a fine cellulose fiber nonwoven fabric layer having a mean fiber diameter of 0.005 µm to 0.5 µm on a nonwoven fabric layer by a papermaking method, and a step for drying the resulting laminated nonwoven fabric.

[15] The method described in [14] above, further comprising a heat treatment step following the drying step.

[16] The method for producing the multilayered structure described in [14] above, comprising:

a step for forming a hydrophilic coating layer by coating onto one side or both sides of the multilayered structure described in any of [1] to [6] above.

[17] An energy recovery ventilation element wherein the energy recovery ventilation sheet described in any of [9] to [13] above is used as a partitioning material that partitions two types of air flow of different temperature, humidity or both.

[18] An energy recovery ventilator using the energy recovery ventilation element described in [17] above.

Effects of the Invention

Although the multilayered structure of the present invention can be preferably used in all applications requiring large permeability resistance and high moisture permeability as a result of demonstrating both of these physical properties, it can be particularly preferably used as a partitioning material (total heat exchange element) that partitions two types of air having different temperature, humidity or both in energy recovery ventilators for office air-conditioners or home use and the like. Namely, since this energy recovery ventilation element is more permeable to moist air than conventional energy recovery ventilation sheets due to the thin closed portions that partition air, it is highly effective in retaining moisture. Moreover, since the multilayered structure provided by the present invention also has superior durability, the use of this structure in an energy recovery ventilator makes it possible to provide an energy recovery ventilator that demonstrates extremely high humidity exchange efficiency and total energy recovery effectiveness over a long period of time.

EMBODIMENTS FOR CARRYING OUT THE INVENTION

Figure 1:
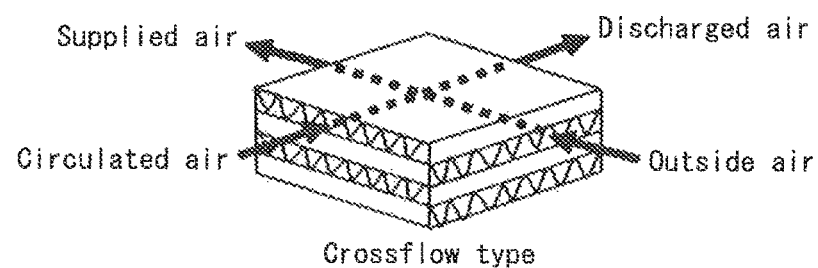
FIG. 1 is a schematic diagram showing the structure of a static-type energy recovery ventilator.
Figure 1:
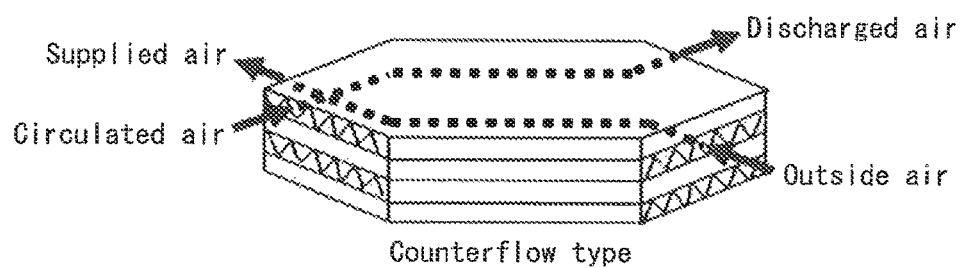

The multilayered structure of the present invention comprises at least one layer or multiple layers of a fine cellulose fiber nonwoven fabric layer composed of fine cellulose fibers. Desired permeability resistance, moisture permeability and durability are unable to be achieved unless the structure is composed of fine cellulose fibers.

The material of the fine cellulose fibers that compose the fine cellulose fiber nonwoven fabric layer preferably contains 50% by weight to 100% by weight of pure cellulose fibers composed of cellulose such as coniferous wood pulp, deciduous wood pulp, cotton-derived pulp, hemp-derived pulp (such as abaca hemp or sisal hemp), kenaf-derived pulp, bamboo-derived pulp, bagasse-derived hemp, bacterial cellulose, rayon, cupra or lyocell, or cellulose derivative fibers such as cellulose acetate, cellulose acetate propionate, cellulose acetate butyrate, carboxymethyl cellulose, carboxyethyl cellulose, nitrocellulose or methyl cellulose. If the content thereof is less than 50% by weight, sufficiently large permeability resistance is not acquired when forming the nonwoven fabric layer, thereby making this undesirable. Furthermore, from the viewpoint of high permeability resistance, which is one of the characteristics of the multilayered structure of the present invention, the proportion of fine cellulose fibers in the fiber material that composes the fine cellulose fiber nonwoven fabric layer is preferably 70% by weight, and from the viewpoint of forming a layer having higher air permeation resistance, the proportion of pure cellulose fine fibers is more preferably 80% by weight or more and most preferably 90% by weight or more. As a result, large permeability resistance can be preferably achieved while at the same time achieving high moisture permeability. However, other fine fibers may also be mixed in provided the range of the content of cellulose fibers is 50% by weight or more, and fine fibers such as heat-fusible polyethylene fibers, polypropylene fibers, polyketone fibers or polyester fibers may be contained in order to improve strength, for example.

The fine cellulose fibers that compose the fine cellulose fiber nonwoven fabric layer are preferably cellulose microfibrils. Here, cellulose microfibrils refer to cellulose fibers and/or bundles thereof having a fiber diameter of several nm to 200 nm composed of natural cellulose or regenerated cellulose. More specifically, cellulose microfibrils refer to independent microfibrils, or fine fibers obtained by the bundling thereof torn off from a fiber surface, that are obtained by carrying out microfibrillation treatment with a device that applies a high degree of shear force, such as a high-pressure homogenizer, ultra-high-pressure homogenizer or grinder, on cellulose produced by acetic acid bacteria or other bacteria referred to as bacterial cellulose, or plant-derived cellulose such as pulp or animal-derived cellulose such as hoya cellulose collectively referred to as microfibrillated cellulose. In the present invention, microfibrillated cellulose in particular is preferably used as raw material from the viewpoints of cost and quality control. In addition, cut yarn of regenerated cellulose fibers having a fine fiber diameter, cut yarn of cellulose derivative fibers having a fine fiber diameter, regenerated cellulose obtained by electrospinning, or cut yarn of ultrafine yarn of cellulose derivatives can also be used as fine cellulose fibers.

The mean fiber diameter of the fine cellulose fibers of the present invention is 0.005 μm to 0.5 μm. Here, the mean fiber diameter of the fine cellulose fibers refers to the number average fiber diameter as determined from SEM images or TEM images of the surface, and complies with the evaluation means described in International Publication No. WO 2006/4012. In general, nonwoven fabric composed of cellulose fibers is said to tend to demonstrate an increase in thermal, conductivity as fiber diameter becomes narrower under conditions such that porosity remains constant. As fiber diameter increases, the network density of the fiber network that occupies a fixed space decreases, and since the efficiency of surface conduction, which is thought to contribute to thermal conduction, worsens, thermal conductivity ends up decreasing. The inventors of the present invention found that, by making the fiber diameter of cellulose fibers to be 0.5 μm or less, an extremely dense layer having large permeability resistance can be formed as a nonwoven fabric layer at a low basis weight, and since the nonwoven fabric layer can be designed to have constituent fibers having a narrow fiber diameter and low basis weight, a sheet having relatively large thermal conductivity can be produced. On the other hand, since it is difficult to stably produce fine cellulose fibers having a fiber diameter of less than 0.005 μm, the fiber diameter of the fine cellulose fibers is preferably 0.008 μm to 0.4 μm and more preferably 0.015 μm to 0.3 μm.

The fine cellulose fiber nonwoven fabric layer can be composed with a fine cellulose fiber nonwoven fabric composed of fine cellulose fibers having a degree of polymerization (DP) of 100 to 12,000. Degree of polymerization is the number of repetitions of glucose rings that form the cellulose molecular chain. By making the degree of polymerization to be 100 or more, the tensile strength and elastic modulus of the fibers per se improve, and as a result thereof, the strength of the nonwoven fabric structure improves, and handling ease when attaching to an energy recovery ventilation element as well as quality stability when using an energy recovery ventilator improve. Although there is no particular upper limit on the degree of polymerization of the fine cellulose fibers, it is substantially difficult to acquire cellulose having a degree of polymerization in excess of 12,000 and this cannot be used industrially. From the viewpoint of handling ease and industrial applicability, the degree of polymerization of the cellulose fibers is preferably 150 to 8,000 and more preferably 300 to 6,000.

The surface or interior of the fine cellulose fibers that compose the fine cellulose fiber nonwoven fabric layer may be chemically modified. For example, fibers in which a portion or the majority of hydroxyl groups present on the surface of fine cellulose fibers (cellulose microfibrils) have been esterified, including acetic acid esters, nitric acid esters and sulfuric acid esters, etherified fibers including alkyl ethers represented by methyl ether, carboxy ethers represented by carboxymethyl ether and cyanoethyl ethers, or fibers in which hydroxyl groups at the 6 position have been oxidized by a TEMPO oxidation catalyst (such as 2,2,6,6-tetramethylpiperidinooxy radical) and converted to carboxyl groups (including acid forms and salt forms), can also be included.

The fine cellulose fiber nonwoven fabric layer in the multilayered structure of the present invention has a low basis weight, and as a result thereof, it is important that the thickness of the layer be thin. In the present invention, since a dense, thin layer having a small pore diameter is formed that is substantially composed of fine cellulose fibers, it can be designed to have a large permeability resistance and high moisture permeability. This is because, in addition to being able to be designed so as to have short water vapor permeation paths due to the thin layer thickness, since the layer is further composed of fine fibers, the surface area of fibers present within the layer becomes large and the migration path density per unit area of water vapor that migrates across interfaces between fibers can be designed to be high, and as a result thereof, high moisture permeability can be demonstrated.

At the same time, due to the thin size of the thin, dense fine cellulose fiber nonwoven fabric layer along with the large density at which constituent fine fibers are present per unit area (namely, internal interfacial area), surface thermal conductivity at fiber interfaces can be secured, thereby enabling the layer per se to retain high thermal conductivity.

The basis weight (weight per unit area) of the fine cellulose fiber nonwoven fabric layer in the multilayered structure of the present invention as the total sum thereof is within the range of 1 g/m² to 15 g/m², preferably within the range of 2 g/m² to 10 g/m², and more preferably within the range of 3 g/m² to 8 g/m². If within these ranges, the three properties of permeability resistance, moisture permeability and thermal conductivity can be demonstrated in the proper balance. If the total sum of the basis weight is less than 1 g/m², it becomes difficult to uniformly maintain permeability resistance at 2000 s/100 ml or more, while if the total sum of basis weight exceeds 15 g/m², moisture permeability tends to decrease, thereby making both cases undesirable. Furthermore, the "total sum of basis weight" refers to that determined by adding the basis weight of each layer in the case the nonwoven fabric consists of two or more layers. For example, in the case of coating a fine cellulose dispersion onto the nonwoven fabric by dip coating, the resulting structure has three layers with a support located in the central layer (and comprising two fine cellulose fiber nonwoven fabric layers). In addition, if the total sum of the thickness of the fine cellulose fiber nonwoven fabric layer is 0.5 μm to 15 μm, more preferably 1 μm to 12 μm and most preferably 1.5 μm to 8 μm, the three properties of permeability resistance, moisture permeability and thermal conductivity can be demonstrated in the proper balance. If the total sum of the layer thickness is less than 0.5 μm, it becomes difficult to uniformly maintain permeability resistance at 2000 s/100 ml, while if the total sum of the layer thickness exceeds 15 μm, moisture permeability tends to decrease, thereby making both cases undesirable. Here, the thickness of the fine cellulose fiber nonwoven fabric layer refers to the value obtained by observing a cross-sectional SEM image of the multilayered structure of the present invention.

In the present invention as described above, although it is important to design the layer(s) of the fine cellulose fiber nonwoven fabric to be thin and have a low basis weight, since it becomes difficult to maintain a level of mechanical strength that permits handling as a sheet material at that time with the fine cellulose fiber nonwoven fabric layer alone, in the present invention, another porous sheet is used as a support, and one or more of the layers is laminated thereon to obtain a multilayered structure. The mean thickness of the multilayered structure of the present invention, including the support layer, is 1.0 μm to 200 μm, preferably 10 μm to 150 μm, more preferably 10 μm to 70 μm and even more preferably 10 μm to 30 μm. If the mean thickness of the multilayered structure of the present invention is less than 10 μm, it becomes difficult to design the multilayered structure to have mechanical strength that does not present a problem in terms of handling, while if the mean thickness exceeds 200 μm, rigidity becomes excessively high for use as a sheet, which again results in problems in terms of handling, thereby making this undesirable.

The total, sum of the basis weight (total of weight per unit area) of the multilayered structure of the present invention is preferably 10 g/n to 100 g/m². If the total, sum of basis weight is less than 10 g/m², air permeation resistance and mechanical strength are unable to be obtained. A nonwoven fabric structure having a basis weight in excess of 100 g/m² results in difficulty in obtaining adequate moisture permeability, while at the same time being disadvantageous from the viewpoint of thermal conductivity. The sum total of basis weight is preferably 12 g/m² to 80 g/m² and more preferably 14 g/m² to 60 g/m². Particularly in the case the multilayered structure of the present invention is a multilayered structure having a two-layer structure consisting of a support layer and a fine cellulose fiber nonwoven fabric layer composed of fine cellulose fibers having a mean fiber diameter of 0.005 μm to 0.5 μm, from the viewpoints of the proper balance between permeability resistance and moisture permeability and economic reasons, if the basis weight of the fine cellulose fiber nonwoven fabric layer is designed to be 1 g/m² to 15 q/m² and the basis weight of the support layer is designed to be 9 g/m² to 99 g/m², more preferably the basis weight of the fine cellulose fiber nonwoven fabric layer is designed to be 2 g/m² to 10 g/m² and the basis weight of the support layer is designed to be 10 g/m² to 78 g/m², and most preferably the basis weight of the fine cellulose fiber nonwoven fabric layer is designed to be 3 g/m² to 8 g/m² and the basis weight of the support layer is designed to be 11 g/m² to 57 g/m², high performance can be achieved as the previously described multilayered structure.

The density of the multilayered structure of the present invention is 0.10 g/cm³ to 0.90 g/cm³ and more preferably 0.30 g/cm³ to 0.80 g/cm³. Since the multilayered structure of the present invention has a structure in which a dense fine cellulose fiber layer is laminated on a porous support, despite having high permeability resistance overall, it is also characterized by having low density as this type of sheet material. If the density is less than 0.10 g/cm³, mechanical strength as a sheet material cannot be secured, thereby making this undesirable, while in order to obtain high density of greater than 0.90 g/cm³, the permeability resistance of not only the fine cellulose fiber layer but also the support layer becomes high and density increases, thereby making this undesirable since it becomes difficult to demonstrate the effect of the present invention in the form of high moisture permeability. Here, density can be determined according to the following relational expression using the measured overall basis weight W (g/m²) and overall mean thickness D (μm) of the multilayered structure:

$$\text{Density (g/cm}^3\text{)} = W \times (10^{-2})^2 (\text{g/cm}^2)/(D \times 10^{-4}) \text{ (cm)}$$
$$= W/D$$

In addition, the permeability resistance of the multilayered structure of the present invention (measured according to the paper pulp test method of the Japan Technical Association of the Pulp and Paper Industry (TAPPI)) is 2000 s/100 ml or more. If the permeability resistance is less than 2000 s/100 ml, in the case of applying the multilayered structure of the present invention as an energy recovery ventilation sheet, for example, since not only moisture but also air ends up leaking when air passes through the energy recovery ventilation sheet, warm air and cool air end up mixing, thereby preventing the ventilation function from being demonstrated. In order to demonstrate the function as an energy recovery ventilator, permeability resistance is preferably 3000 s/100 ml or more, and in the case of using as an energy recovery ventilation sheet, permeability resistance is preferably 4000 s/00 ml or more. Although the upper limit of permeability resistance is preferably the higher the better (the larger the better), it is preferably 10 million s/100 ml or less since this is the detection limit of measuring instruments.

As was previously described, the proportion of fine cellulose fibers contained in the fine cellulose fiber nonwoven fabric layer is 50% by weight to 100% by weight and preferably 70% by weight to 100% by weight. Although examples of other materials contained in the layer include fibrous materials composed of materials other than cellulose, inorganic fillers, polymers and inorganic particles, any such material may be contained provided the material allows the formation of a uniform and dense layer so as to maintain permeability resistance at 2000 s/100 ml or more. If the proportion of fine cellulose fibers in the layer is less than 50% by weight, it becomes difficult to design the layer to have a permeability resistance of 2000 s/100 ml or more, thereby making this undesirable.

In the multilayered structure of the present invention, if one layer is a nonwoven fabric layer and/or porous film and/or fabric composed of one or a combination of a plurality of fibers selected from the group consisting of regenerated cellulose fibers, natural cellulose fibers, nylon fibers, polyester fibers and polyolefin fibers, high strength as a sheet material can be achieved without impairing the important elements of the present invention in the form of thin size and high moisture permeability of the fine cellulose fiber nonwoven fabric layer. Examples of porous films include, but are not limited to, porous films composed of a polyolefin-based resin such as polyethylene or polypropylene, a nylon-based resin such as polysulfone, polytetrafluoroethylene, polyvinyl fluoride, polyvinylidene fluoride, polycarbonate, nylon 6 or nylon 6,6, an acrylic resin such as poly(methyl methacrylate), polyketone and polyether ether ketone. Examples of fabrics include, but are not limited to, fabrics composed of cellulose fibers (including cellulose derivative fibers), nylon fibers, polyester fibers, polyurethane fibers and blended yarns thereof. High moisture permeability is easily demonstrated if permeability resistance in the case of superimposing all nonwoven fabric layers, porous films and fabrics other than the fine cellulose fiber nonwoven fabric layer used in the multilayered structure of the present invention (or one layer only in the case of a single layer) is 200 s/100 ml or less and preferably 100 s/100 ml or less.

The multilayered structure of the present invention preferably contains a nonwoven fabric as a layer other than the fine cellulose fiber nonwoven fabric layer. From the viewpoints of moisture resistance and hydrophilic treatment in particular, a nonwoven fabric composed of a material having hydroxyl groups or amide groups having reaction activity with cellulose or nylon and the like is preferable, and if the nonwoven fabric layer is a nonwoven fabric layer composed of regenerated cellulose fibers and/or a nonwoven fabric layer composed of natural cellulose fibers (namely, a paper-based material), the layer can be designed to have high adhesive strength with the fine cellulose fiber nonwoven fabric layer, thereby making this preferable. Among these two types or a mixture thereof, a nonwoven fabric layer composed of regenerated cellulose fibers having high hydrophilicity is more preferably selected as one layer from the viewpoint of improving moisture permeability.

Examples of the material of the nonwoven fabric layer composed of regenerated cellulose fibers used in the present invention include one type of two or more types selected from the group consisting of regenerated cellulose fibers such as cupra, viscose rayon or polysonic rayon and refined cellulose obtained by solution spinning. In addition, although short fibers or long fibers can be used for the shape of the fibers, long fibers are preferable and continuous long fibers are more preferable. In addition, although a short fiber nonwoven fabric layer composed of natural cellulose fibers may be contained as one layer of the nonwoven fabric structure in the present invention, examples of the material of the nonwoven fabric layer in this case include coniferous wood pulp, deciduous wood pulp, cotton-derived pulp, hemp-derived pulp (such as abaca hemp or sisal hemp), kenaf-derived pulp, bamboo-derived pulp and bagasse-derived pulp.

Here, in the case of selecting a nonwoven fabric composed of regenerated cellulose fibers, a specific example of continuous long fibers is regenerated cellulose continuous long fibers obtained by continuously spinning an undiluted cuprammonium rayon solution onto a net according to the downstream stretch spinning method, entangling the fibers by self-adhesion of the fibers per se, and hydro-entangling as necessary followed by forming into a nonwoven fabric. A specific example thereof is Bemliese® (Asahi Kasci Fibers Corp.). Since regenerated cellulose continuous long fibers (Bemliese) have greater thermal conductivity and higher hygroscopicity than other regenerated cellulose fibers such as rayon, they are used particularly preferably as a layer of the nonwoven fabric structure since they allow the design of greater moisture absorption due to exchange of latent heat. Since a large number of continuous long fibers that compose Bemliese undergo self-adhesion while coagulating in the spinning bath, adequate strength is able to be obtained as a nonwoven fabric even without carrying out entangling with high-pressure water as in the case of short fiber nonwoven fabrics, which is also preferable in terms of use as a layer of a nonwoven fabric structure.

Although the continuous long fibers can be applied within a range of fineness of 0.1 dtex to 3 dtex, in the case of using in the form of a fiber composite with fine cellulose fibers, fineness is preferably within the range of 0.1 dtex to 1.0 dtex from the viewpoints of being able to maintain entanglement strength with the fine cellulose fibers and reducing air permeability.

From the viewpoint of improving efficiency of the manufacturing process, the multilayered structure of the present invention is preferably a two-layer structure consisting of a fine cellulose fiber nonwoven fabric layer composed of fine cellulose fibers and a support in the form of a nonwoven fabric layer or porous film, and for the additional reasons previously described, is preferably a two-layer structure in the form of a nonwoven fabric structure consisting of a fine cellulose fiber nonwoven fabric layer composed of fine cellulose fibers and a nonwoven fabric layer composed of regenerated cellulose fibers from the viewpoint of being able to favorably demonstrate performance as an energy recovery ventilation sheet. In addition, from the viewpoint of retaining strength, the nonwoven fabric layer composed of regenerated cellulose fibers is preferably a nonwoven fabric layer composed of regenerated cellulose continuous long fibers.

The tensile strength of the multilayered structure of the present invention is preferably 0.3 kg/15 mm to 4.0 kg/15 mm. If the tensile strength is less than 0.3 kg/15 mm, since, for example, problems occur such as tearing of the sheet in a step for producing an energy recovery ventilation element by using as an energy recovery ventilation sheet in the production process of energy recovery ventilator, or the possibility of tearing during use increases, there is the risk of the multilayered structure no longer functioning as an energy recovery ventilation sheet. Although the maximum tensile strength of this nonwoven fabric structure is 4.0 kg/15 mm, there is no particular upper limit on tensile strength, and the higher the tensile strength the better in terms of applying the multilayered structure to various applications. Tensile strength is more preferably 0.5 kg/15 mm or more and even more preferably 0.8 kg/15 mm or more.

In addition, the multilayered structure according to the present invention can be preferably used in applications requiring durability by undergoing waterproofing treatment. Examples of waterproofing treatment means include the addition of an internally added additive such as a sizing agent, wet strengthening agent or crosslinking agent during production of the multilayered structure and the coating of a waterproofing agent during post-processing.

Examples of internally added waterproofing agents include, but are not limited to, sizing agents such as rosin soap, alkylketene dimers, alkenyl succinic anhydrides or polyvinyl alcohol, wet strengthening agents such as urea formaldehyde resins, melamine formaldehyde resins or polyvinylamines, and crosslinking agents such as polyamidoamine epichlorohydrin (PAE) or polyfunctional blocked isocyanates (BI). Among these, crosslinking-type waterproofing agents in the manner of PAE or BI are particularly preferable since they demonstrate extremely potent waterproofing effects, and when considering the negative zeta potential on the surface of fine cellulose fibers, the use of cationic BI or the cationic compound of PAE is preferable since it enables waterproofing effects to be demonstrated efficiently. With respect to crosslinking-type waterproofing agents, since covalent bonds are formed with multifunctional isocyanates formed from BI when a support is used that is composed of cellulose (hydroxyl groups) or nylon (amide groups) having crosslinking reaction sites, adhesive strength between the support and the fine cellulose fiber nonwoven fabric layer can be enhanced, thereby making this preferable. Furthermore, BI is a compound that imparts stability in water by protecting polyfunctional isocyanates with blocking groups (such as amidoxime or ε-caprolactam), and as a result of being able to stably disperse in a papermaking dispersion used in a papermaking process to be subsequently described and by carrying out drying and heat treatment (normally at 130° C. or higher) following papermaking, the blocking groups are eliminated and isocyanates are formed, resulting in a compound that reacts with surrounding reaction sites (hydroxyl groups or amide groups).

Examples of waterproofing treatment carried out in post-processing include, but are not limited to, treatment with a diisocyanate-based crosslinking agent such as hexamethylene diisocyanate or 4,4'-methyenebisphenyl diisocyanate in an organic solvent, and treatment in an aqueous medium with a melamine resin or a crosslinking agent such as ethylene glycol diglycidyl ether.

Moreover, moisture permeability can be further improved if the multilayered structure of the present invention is subjected to hydrophilic treatment according to the purpose of use. For example, in order to enhance the latent heat exchange rate in an energy recovery ventilation sheet, carrying out hydrophilic treatment makes it possible to design the sheet to have higher moisture permeability, thereby making this preferable. Examples of hydrophilic treatment means include a method consisting of imparting high hydrophilicity to the surface and/or interior of a fine cellulose fiber layer by an internal addition method, and a method consisting of introducing a hydrophilic compound into the surface layer of the multilayered structure by post-processing.

With respect to the internal addition method, a hygroscopic hydrophilic compound that is cationic in a papermaking dispersion of fine cellulose fibers can be added and adsorbed by utilizing the aforementioned negative zeta potential of cellulose, followed by forming the dispersion into paper and laminating on a support to make the entire fine cellulose nonwoven fabric layer more hydrophilic. This method is effective since it leads to immobilization of the hydrophilic compound on the surface and/or interior of the fine cellulose nonwoven fabric layer simultaneous to combining the use of a crosslinking agent in the aforementioned waterproofing treatment, internally adding a hydrophilic compound, forming into paper after having adsorbed and immobilized on the surface of the fine cellulose fibers and laminating on a support, and simultaneous to waterproofing by the progression of a crosslinking reaction attributable to heat treatment. The hydrophilic compound used for this purpose is preferably a hydrophilic compound that contains sites that react with the crosslinking agent in the molecular framework thereof. In the case of using cationic BI for the waterproofing agent, examples of hydrophilic compounds having hydroxyl groups, amine groups or amide groups and the like having reactivity with isocyanates include, but are not limited to, anionic and cationic polyvinyl alcohols (copolymers of vinyl alcohol and an anionic or cationic vinyl monomer).

Examples of post-processing methods include a method consisting of coating or spraying a solution or dispersion of a hydrophilic compound having high hydrophilicity onto the multilayered structure, and a method consisting of immersing the multilayered structure in a solution of a hydrophilic compound followed by drying.

Examples of hydrophilic compounds able to be used in the aforementioned hydrophilic treatment include salts of inorganic acids, salts of organic acids, inorganic fillers, polyvalent alcohols, ureas and hydroscopic (moisture absorbent) polymers (water-soluble polymers and hydrophilic polymers capable of forming a hydrogel), and examples of moisture absorbents include salts of inorganic acids such as lithium chloride, calcium chloride or magnesium chloride, salts of organic acids such as sodium lactate, calcium lactate or sodium pyrrolidone carboxylate, inorganic fillers such as aluminum hydroxide, calcium carbonate, aluminum silicate, magnesium silicate, talc, clay, zeolite, diatomaceous earth, sepiolite, silica gel and activated charcoal, examples of polyvalent alcohols include glycerin, ethylene glycol, triethylene glycol or polyglycerin, ureas such as urea or hydroxyethylurea, and hydroscopic (water absorbent) polymers such as polyaspartic acid, polyacrylic acid, polyglutamic acid, polylysine, alginic acid, carboxymethyl cellulose, carboxyethyl cellulose, hydroxylalkyl cellulose and salts or crosslinked products thereof, carrageenan, pectin, gellan gum, agar, xanthan gum, hyaluronic acid, gua gum, gum arabic, starch and crosslinked products thereof, polyethylene glycol, polypropylene glycol, collagen, acrylonitrile-based polymer saponification products, starch/acrylonitrile graft copolymers, acrylate/acrylamide copolymers, polyvinyl alcohol/maleic anhydride copolymers or polysaccharide/acrylate graft self-crosslinking products, and are used by selecting the type and adhered amount corresponding to the purpose of use such as an extender or bulking agent in addition to use as a moisture absorbent. Furthermore, the aforementioned inorganic fillers refer to inorganic minerals or inorganic salts and the like that are used for the purpose of extenders or bulking agents in addition to moisture absorption. There are also cases in which it is effective to have a water-soluble polymer, including those described in the aforementioned description, salt of an inorganic acid and salt of an organic acid present for the purpose of solidifying the moisture absorbent (so that the moisture absorbent does not migrate during high humidity).

Moreover, the multilayered structure of the present may also contain arbitrary additives in addition to the aforementioned waterproofing agents and hydrophilic compounds within a range that does not impair the moisture permeability or air permeation resistance of the multilayered structure of the present invention.

Although additives other than waterproofing agents and hydrophilic compounds (such as flame retardants in a total heat exchanger sheet) can be suitably used to improve the performance of the multilayered structure of the present invention as previously described, the total content thereof is preferably held to 30% by weight or less, more preferably 20% by weight or less and even more preferably 10% by weight or less of the total weight of the energy recovery ventilation sheet. When within these ranges, a high-performance multilayered structure of the present invention can be provided. Since many of these types of additives are highly active as chemical substances instead of demonstrating effects for various purposes, if the total content thereof exceeds 30% by weight, the durability of the base material in the form of the multilayered nonwoven fabric structure sheet of the present invention is significantly impaired, thereby making this undesirable.

Since the multilayered structure of the present invention demonstrates high moisture permeability and high thermal conductivity, when the nonwoven fabric is used as an energy recovery ventilation sheet, for example, energy recovery effectiveness can be significantly improved. More specifically, the nonwoven fabric structure of the energy recovery ventilation sheet of the present invention is able to demonstrate moisture permeability (as measured in accordance with JIS L 1099 Method A-1) of preferably 5000 g/m$^2$/24 hr or more, more preferably 7000 g/m$^2$/24 hr or more and even more preferably 8000 g/m$^2$/24 hr. Moisture permeability is preferably as high as possible when using as an energy recovery ventilation sheet.

Moreover, although the multilayered structure according to the present invention is able to achieve comparatively high thermal conductivity within a range of 0.0100 W/(m·K) to 0.1000 W/(m·K), in the case of using the multilayered structure of the present invention as an energy recovery ventilation sheet, for example, as was previously described, since thermal conductivity is substantially governed by the dense fine cellulose fiber nonwoven fabric layer serving as an air resistant layer, as a result of making this layer to be thin, high thermal conduction efficiency, namely a high sensible heat exchange rate, can be demonstrated that is equal to or greater than the value of thermal conductivity of the multilayered structures indicated in the examples.

As a result, the multilayered structure of the present invention can be applied to all applications that take advantage of high moisture permeability, high permeability resistance and comparatively high thermal conductivity in addition to the aforementioned energy recovery ventilation sheet. Examples of such applications include, but are not limited to, water treatment films like those used in membrane distillation requiring high water vapor permeability, and clothing materials requiring low water permeability (equivalent to high permeability resistance) and low water vapor permeability.

As was previously described in part, the multilayered structure of the present invention is able to impart a high energy exchange rate when used as a energy recovery ventilation sheet. Namely, in FIG. 1 showing the structure of an energy recovery ventilation element (laminated cartridge referred to as an element) used in a static-type energy recovery ventilator in particular, the multilayered structure of the present invention can be preferably used as a partitioning material that partitions exhaust air and intake air due to the high permeability resistance, high moisture permeability and comparatively high thermal conductivity thereof.

A thin sheet is preferably used for the energy recovery ventilation sheet of the present invention based on requirements for reducing size and improving thermal conductivity of the energy recovery ventilation element, and the overall mean thickness thereof is 10 μm to 200 μm, preferably 10 pin to 120 μm, more preferably 10 μm to 70 μm and even more preferably 10 μm to 30 μm. It becomes technically difficult to produce a sheet having a mean thickness of less than 30 μm, while a sheet having mean thickness in excess of 120 μm undergoes a considerable decrease in thermal conductivity, thereby making this undesirable.

The energy recovery ventilation sheet of the present invention can also be designed to undergo flame retardation treatment. In particular, in the case of using this energy recovery ventilation sheet according to the present invention in an energy recovery ventilator installed in a building, it preferably has incombustibility that passes Grade 2 Incombustibility or Grade 3 Incombustibility of the Testing Method for Incombustibility of Thin Materials for Buildings (JIA A 1322). Furthermore, it more preferably has incombustibility that passes Grade 2 Incombustibility or Grade 1 Incombustibility. An example of this flame retardation treatment is a method consisting of coating a flame retardant onto the aforementioned nonwoven fabric structure, and more specifically, includes a method consisting of coating or spraying a flame retardant onto the surface of the nonwoven fabric structure and a method consisting of immersing the nonwoven fabric structure in a solution of a flame retardant.

Examples of flame retardants that can be used in the present invention include inorganic flame retardants, inorganic phosphorous-based compounds, nitrogen-containing compounds, chlorine-based compounds, antimony trioxide, ammonium phosphate and bromine-based compounds, and flame retardants that can be dispersed in an aqueous solution or water, such as antimony trioxide, ammonium phosphate, ammonium polyphosphate, ammonium sulfaminate, guanidine sulfaminate, guanidine phosphate, phosphoric amides, chlorinated polyolefins, ammonium bromide or non-ether-based polybromo cyclic compounds.

The content of the aforementioned flame retardants is preferably 1% by weight to 15% by weight of the total heat exchanger sheet. If the content thereof is less than 1% by weight, it becomes difficult to demonstrate flame retardation effects. If flame retardant is contained in excess of 15% by weight, moisture permeability and energy recovery effectiveness decrease. The content of flame retardant is more preferably 2% by weight to 10% by weight and more preferably 3% by weight to 8% by weight.

The following provides an explanation of an example of a method for producing the multilayered structure of the present invention.

The multilayered structure containing a fine cellulose fiber nonwoven fabric layer used in the present invention can be produced by first preparing an aqueous dispersion of fine cellulose fibers followed by depositing in the form of a film according to the method described below using the aqueous dispersion.

All types of wood pulp, such as coniferous wood pulp or deciduous wood pulp, can be used as raw material when producing fine cellulose fibers. Examples of non-wood pulp include cotton-derived pulp including cotton linter pulp, hemp-derived pulp, bagasse-derived pulp, kenaf-derived pulp, bamboo-derived pulp and straw-derived pulp. Cotton-derived pulp, bamboo-derived pulp, bagasse-derived pulp, kenaf-derived pulp, bamboo-derived pulp and straw-derived pulp respectively refer to refined pulp obtained by subjecting raw materials such as cotton lint or cotton linter, hemp-based manila hemp (frequently produced in Ecuador or the Philippines), sisal hemp, bagasse, kenaf, bamboo or straw to a refining step or bleaching step such as delignination by digestion treatment. In addition, seaweed-derived pulp or refined ascidian-based cellulose can also be used as raw materials. Moreover, cut yarn of refined cellulose fibers and cut yarn of cellulose derivative fibers can also be used as raw materials, and regenerated cellulose obtained by electrospinning, cut yarn of ultrafine cellulose derivatives, as well as raw materials of fine cellulose fibers and fine cellulose fibers per se can also be used as raw materials.

The following provides a description of a method for reducing the diameter of cellulose fibers.

Reduction of the diameter of cellulose fibers is preferably carried out by going through a pretreatment step, a beating treatment step and a downsizing step.

In the pretreatment step, it is effective to put the raw material pulp into a state that facilitates downsizing by autoclave treatment by impregnating with water at a temperature of 100° C. to 150° C., enzyme treatment or a combination thereof. Since this pretreatment not only reduces the burden of downsizing treatment, but also the effect of causing impurities such as lignin or hemicellulose present on the surface and in the gaps of microfibrils comprising the cellulose fibers to be discharged into an aqueous phase, thereby resulting in enhancement of the α-cellulose purity of the resulting fibers, this treatment is extremely effective for improving the heat resistance of fine cellulose fiber nonwoven fabrics.

In the beating treatment step, the raw material pulp is dispersed in water to a solid concentration of 0.5% by weight to 4% by weight, preferably 0.8% by weight to 3% by weight, and more preferably 1.0% by weight to 2.5% by weight, and a high level of fibrillation is promoted with a beating device in the manner of a beater or disk refiner (double disk refiner). In the case of using a disk refiner, if treatment is carried out while setting the clearance between disks to be as narrow as possible (for example, 0.1 mm or less), since an extremely high degree of beating (fibrillation) occurs, there are cases in which this effective since the conditions of downsizing treatment using a high-pressure homogenizer and the like can be relaxed.

The preferable degree of beating treatment is determined in the manner indicated below.

In studies conducted by the inventors of the present invention, the cutoff shifted fiber (CSF) value (which indicates the degree of beating of cellulose, and is evaluated with the Canadian standard freeness test for pulp as defined in JIS P 8121) decreased over time as beating treatment progressed, and after temporarily approaching zero, was confirmed to demonstrate a trend that causes it to again increase as beating treatment continues, and in order to prepare fine cellulose fibers serving as raw materials of the nonwoven fabric structure of the present invention, it was determined to be preferable to carry out pretreatment in the form of beating treatment until the CSF value temporarily approached zero followed by continuing beating treatment until the CSF began to rise again. In the present invention, the CSF value during the course of the CSF value decreasing from prior to beating is represented by *↓, while the CSF value that tends to increase after having reached zero is represented by *↑. During the beating treatment, the CSF value is preferably at least zero and more preferably CSF 30↑. In an aqueous dispersion (to be referred to as a slurry) prepared to this degree of beating, fibrillation progresses considerably such that simultaneous to being able to provide a filter medium that does not contain coarse cellulose fibers having a maximum fiber diameter in excess of 2500 nm, the filter medium composed of a fine cellulose fiber nonwoven fabric obtained from the slurry tends to demonstrate improved tensile strength perhaps from an increase in the number of contact points among cellulose microfibrils. In addition, a slurry that has been beaten to a high degree having a CSF value of at least zero or subsequently having a value of ***↑ demonstrates increased uniformity while also offering the advantage of improved production efficiency in that it is able reduce clogging during downsizing treatment attributable to the subsequent high-pressure homogenizer and the like.

In order to produce fine cellulose fibers, downsizing treatment is preferably carried out with a high-pressure homogenizer, ultra-high-pressure homogenizer or grinder and the like following the aforementioned beating step. The solid concentration in the aqueous dispersion at this time is 0.5% by weight to 4% by weight, preferably 0.8% by weight to 3% by weight, and more preferably 1.0% by weight to 2.5% by weight in compliance with the aforementioned beating treatment. The use of such a solid concentration prevents the occurrence of clogging and enables efficient downsizing treatment to be achieved.

Examples of high-pressure homogenizers used include the Model NS High-Pressure Homogenizer manufactured by GEA Niro Soavi, the Linear Type (Model R) High-Pressure Homogenizer manufactured by SMT Co., Ltd., and the high-pressure homogenizer manufactured by Sanwa Machinery Trading Co., Ltd., and devices other than those listed above may also be used provided they are able to carry out downsizing using nearly the same mechanism as these devices. Ultra-high-pressure homogenizers refer to high-pressure collision-type micronization treatment machines such as the Microfluidizer manufactured by Mizuho Industrial Co., Ltd., the Nanomizer manufactured by Yoshida Kikai Co., Ltd. and the Ultimaizer manufactured by Sugino Machine Ltd., and devices other than those listed above may also be used provided they are able to carry out downsizing using nearly the same mechanism as these devices. Although examples of grinder-type micronizing devices include millstone grinders exemplified by the Pure Fine Mill manufactured by Kurita Machinery Mfg. Co., Ltd. and the Super Mass Colloider manufactured by Masuko Sangyo Co., Ltd., devices other than those listed above may also be used provided they are able to carry out downsizing using nearly the same mechanism as these devices. The fine cellulose fibers obtained in this manner are normally referred to as microfibrillated cellulose (MFC).

The fiber diameter of the fine cellulose fibers can be controlled according to the conditions during downsizing treatment using a high-pressure homogenizer and the like (such as the device selected, operating pressure and number of passes) or the conditions during pretreatment (such as autoclave treatment, enzyme treatment or beating treatment) prior to the downsizing treatment.

Moreover, cellulose-based fine fibers obtained by subjecting the MFC produced according to the aforementioned process to surface chemical treatment and cellulose-based fine fibers in which hydroxyl groups at position 6 have been oxidized and converted to carboxyl groups (including acidic and basic types) with a TEMPO oxidation catalyst can also be used as fine cellulose fibers able to be used in the present invention. In the case of the former, by carrying out various types of surface chemical treatment corresponding to the particular purpose, esterified forms, including acetic acid esters, nitric acid esters and sulfuric acid esters in which a portion or a majority of hydroxyl groups present on the surface of the fine cellulose fibers (cellulose microfibrils) are esterified, or etherified forms, including alkyl ethers represented by methyl ether, carboxy ethers represented by carboxymethyl ether and cyanoethyl ether, can be suitably prepared and used. In addition, in the preparation of the former, namely fine cellulose in which hydroxyl groups at position 6 have been oxidized with a TEMPO oxidation catalyst, a dispersion of fine cellulose can be obtained without necessarily requiring the use of a downsizing device requiring high energy in the manner of a high-pressure homogenizer. As is described in the literature (A. Isogai, et al., Biomacromolecules, 7, 3687-1691 (2006)), for example, by adding an oxidizing agent in the manner of hypochlorous acid to an aqueous dispersion of natural cellulose in the presence of a catalyst referred to as a TEMPO catalyst in the manner of a 2,2,6,6-tetramethylpiperidinooxy radical and an alkyl halide and allowing the reaction to proceed for a fixed period of time, a dispersion of fine cellulose fibers can be obtained extremely easily by carrying out refining treatment such as rinsing with water followed by ordinary mixer treatment. Carboxyl groups are known to be introduced onto the surface of fine cellulose fibers obtained with a TEMPO catalyst, and due to this high hydrophilicity, high moisture permeability is also obtained by using these fine cellulose fibers as a raw material of the present invention.

Next, a description is provided of a method (membrane making method) for forming a multilayered structure that contains fine cellulose fibers and a support layer used in the present invention.

The multilayered structure is preferably produced by using a papermaking method for the membrane making method. Although the multilayered structure can also be formed using a coating method, film deposition according to a papermaking method is preferable from the viewpoint of suitable entanglement in the nonwoven fabric or other support layer and being able to deposit a film with extremely few defects. In either method, an aqueous dispersion of fine cellulose fibers is spread or coated onto various types of supports as previously described followed by lamination.

The following provides an explanation of the method for forming a nonwoven fabric layer composed of fine cellulose fibers contained in the multilayered structure using a papermaking method.

This method is a method for producing a multilayered structure comprising the three steps of (1) a preparation step for preparing an aqueous dispersion containing 0.05% by weight to 0.5% by weight of fine cellulose fibers and 85% by weight to 99.5% by weight of water, (2) a papermaking step for obtaining a concentrated composition in which the concentration of fine cellulose fibers has been increased beyond that of the aqueous dispersion by dehydrating a portion of the water that composes the aqueous dispersion on a support placed in a papermaking machine, and (3) a drying step for evaporating and removing a portion of the water from the concentrated composition by heating the concentrated composition. The multilayered structure of the present invention can be preferably produced by employing a papermaking method in step (2).

The method for forming a fine cellulose fiber nonwoven fabric layer by a papermaking method using the aforementioned aqueous dispersion consists of depositing a wet paper web on a support in the form of a nonwoven fabric, porous film or fabric having the contents described above on wires or filter cloth by a papermaking method from a prescribed aqueous dispersion of fine cellulose fibers, producing a wet paper web having a laminated structure by laminating this depending on the case, and then drying the wet paper web (drying the entire wet paper web laminate in the case of a laminate).

The following provides a detailed explanation of the aforementioned three steps.

The aqueous dispersion of fine cellulose fibers used in the preparation step is preferably an aqueous dispersion containing 0.01% by weight to 0.5% by weight of fine cellulose fibers and 85% by weight to 99.99% by weight of water.

The concentration of fine cellulose fibers in the aqueous dispersion for papermaking is preferably 0.01% by weight to 0.5% by weight and more preferably 0.03% by weight to 0.35% by weight. If within these ranges, papermaking can be carried out stably. If the concentration of fine cellulose fibers in the aqueous dispersion is lower than 0.01% by weight, filtering time becomes extremely long and productivity becomes extremely low, while at the same time, film quality uniformity becomes extremely poor, thereby making this undesirable. In addition, if the concentration of fine cellulose fibers is higher than 0.5% by weight, the viscosity of the dispersion increases excessively and uniform film deposition becomes difficult, thereby also making this undesirable.

Although the solvent of the papermaking dispersion of fine cellulose fibers may be water alone, it is also effective to add various types of compounds for the purpose of controlling physical properties such as moisture permeability or permeability resistance depending on the particular case.

In the case of designing the fine cellulose fiber nonwoven fabric layer to have comparatively high porosity in order to improve moisture permeability, adding a solvent in the form of an organic solvent that dissolves in water or a hydrophobic organic solvent that does not dissolve in water to form an aqueous solution of the organic solvent or emulsion of the organic solvent, respectively, may be effective. Examples of organic solvents that dissolve in water include, but are not limited to, ethanol, methanol, isopropanol and cellosolves such as methyl cellosolve, while examples of hydrophobic organic solvents that do not dissolve in water include, but are not limited to, hydrocarbons in the manner of n-decane or toluene and long-chain alcohols such as 1-hexanol. When assuming that the organic solvent used will be removed in the drying step to be subsequently described, the organic solvent preferably has a boiling point of 160° C. or lower. In addition, the amount of organic solvent used among the total amount of solvent in the composition is preferably 10% by weight or less and more preferably 3% by weight or less for economic reasons. If within these ranges, the multilayered structure of the present invention can be obtained comparatively inexpensively.

In this papermaking method, there are cases in which moisture resistance and greater hydrophilicity can be preferably imparted if the aforementioned waterproofing agents and hydrophilic compounds, namely waterproofing agents such as sizing agents, wet strengthening agents or crosslinking agents, and hydrophilic compounds such as salts of inorganic acids, salts of organic acids, inorganic fillers, polyvalent alcohols, ureas or hygroscopic (moisture absorbent) polymers (water-soluble polymers and hydrophilic polymers capable of forming a hydrogel), are added to the papermaking dispersion in order to enhance moisture permeability. Although it is only necessary to add waterproofing agents and/or hydrophilic compounds in the amounts at which they are effective, they are preferably added within a range that does not impair the stability of the undiluted papermaking solution. For example, in the case of adding a hygroscopic (moisture absorbent) polymer, the hygroscopic (moisture absorbent) polymer improves moisture permeability while at the same time effectively acting as a reinforcing binder by efficiently remaining on the surface of the cellulose. Moisture permeability can be increased by dissolving or finely dispersing a hygroscopic (moisture absorbent) polymer in the aqueous phase of the aqueous dispersion used in this papermaking method, and containing a water-soluble polymer in the fine fiber nonwoven fabric layer. The concentration of hygroscopic (moisture absorbent) polymer is preferably 0.003% by weight to 0.3% by weight, more preferably 0.005% by weight to 0.08% by weight, and even more preferably 0.006% by weight to 0.07% by weight. If within these ranges, simultaneous to it being easy to obtain the fine cellulose fiber nonwoven fabric used in the present invention, there are many cases in which the state of the aqueous dispersion is stabilized, thereby making this preferable. If the concentration is less than 0.003% by weight, it is difficult to demonstrate the effect of adding the hygroscopic (moisture absorbent) polymer, thereby making this undesirable, while if the concentration exceeds 0.3% by weight, there is increased susceptibility to the occurrence of negative effects such as foaming accompanying the increase in the added amount, thereby making this undesirable. In addition, a surfactant may be contained in the hygroscopic (moisture absorbent) polymer in the aqueous dispersion for the purpose of stabilizing the aqueous dispersion provided the total amount of the aforementioned specified water-soluble polymer is within the aforementioned range.

Examples of surfactants in this case include anionic surfactants such as alkyl sulfates, polyoxyethylene alkyl sulfate ester salts, alkyl benzene sulfonates or α-olefin sulfonates, cationic surfactants such as alkyl trimethyl ammonium chloride, dialkyl dimethyl ammonium chloride or benzalkonium chloride, amphoteric surfactants such as trimethylglycine, alkyl dimethyl betaine aminoacetate or alkyl amidodimethyl betaine aminoacetate, and nonionic surfactants such as alkyl polyoxyethylene ethers or fatty acid glycerol esters, although not limited thereto.

In addition, various additives may be added to the aqueous dispersion corresponding to the particular purpose. For example, in addition to additives added for the purpose of waterproofing or flame retardation, inorganic particulate compounds in the manner of silica particles, alumina particles, titanium oxide particles or calcium carbonate particles, resin fine particles, various types of salts or organic solvents, to a degree that does not impair the stability of the aqueous dispersion, may be added within a range (in terms of selection of the type of additive and selection of the composition) that does not have a detrimental effect on the production of the multilayered structure of the present invention. Moreover, short fiber materials other than fine cellulose fibers in the form of fiber materials such as polyester fibers, nylon fibers, acrylic fibers, aramid fibers or cellulose acetate fibers, or fillers such as titanium oxide whiskers, zinc oxide whiskers, glass fibers or carbon fibers, may also be contained in the aqueous dispersion.

The weight percentage of water in the aqueous dispersion is such that the fine cellulose fibers are dissolved or dispersed in the water in a composition containing 85% by weight to 99.99% by weight, preferably 90% by weight to 99.98% by weight and more preferably 92% by weight to 99.97% by weight of water. If the amount of water in the aqueous dispersion is lower than 85% by weight, there are many cases in which viscosity increases, making it difficult to uniformly disperse the slurry in the dispersion while also making it difficult to obtain a nonwoven fabric layer composed of fine cellulose fibers having a uniform structure, thereby making this undesirable. In addition, if the amount of water in the aqueous dispersion exceeds 99.99% by weight, the cellulose content of the composition in which it is incorporated decreases and water drainage during papermaking becomes extremely poor, which has a detrimental effect on productivity, thereby making this undesirable.

Preparation of the aqueous dispersion is carried out by mixing all additives in water to obtain an aqueous slurry dispersion by a suitable dispersing method, or by mixing an aqueous solution preliminarily containing additives with a separately prepared aqueous dispersion of fine cellulose fibers to obtain an aqueous dispersion. At that time, stirring at low speed or high speed with a blender (home mixer) or disperser having blades of the disper type, or using a high-pressure homogenizer under suitably controlled conditions, is preferably used for the mixing and dispersing methods.

The second membrane making step carried out by a papermaking method is a papermaking step consisting of filtering the fine cellulose fibers on a support by dehydrating the aqueous dispersion prepared in the first step with a papermaking machine and concentrating the aqueous dispersion to laminate the support layer and concentrated layer or integrate into a single unit. The papermaking step may be basically carried out by any type of device provided it is a device that uses a filter or filter cloth (also referred to as wires in the technical field of papermaking) so that water is dehydrated from the dispersion containing water and the fine cellulose fibers remain on the support layer.

The use of a device in the manner of an inclined wire type papermaking machine, fourdrinier papermaking machine or cylinder papermaking machine for the papermaking machine allows the obtaining of a multilayered structure containing a preferable sheet-like fine cellulose fiber nonwoven fabric layer having few defects. The papermaking machine may be of the continuous type or batch type and each type may be used corresponding to the particular purpose.

Although dehydration is carried out by the papermaking step using the aqueous dispersion (for papermaking) obtained in the aforementioned preparation step, since the papermaking step is a step for filtering a soft aggregate of fine cellulose and the like dispersed in the aqueous dispersion using wires or filter cloth, even if a support layer is interposed therein, the opening size of the wires or filter cloth is important. In the present invention, any wires or filter cloth can be used provided that the aqueous dispersion for papermaking prepared according to the aforementioned conditions can be substantially made into paper at a yield percentage of water-insoluble components, including cellulose, contained in the dispersion of 70% by weight or more, preferably 95% by weight or more and more preferably 99% by weight or more. In the production of the multilayered structure of the present application, a support in the form of a nonwoven fabric and/or porous film and/or fabric is provided for the lower layer, and since papermaking is carried out thereon, depending on the support, the support per se may retain a high yield percentage of fine cellulose fibers. In such cases, a metal mesh or plastic wires used in ordinary papermaking can be used.

However, even if the yield percentage of cellulose and the like is 70% by weight or more, papermaking takes considerable time unless drainage is high, and since production efficiency becomes remarkably poor, the amount of water permeation of the wires or filter cloth at 25° C. and atmospheric pressure is preferably 0.005 ml/cm$^2$·s or more and more preferably 0.01 ml/cm$^2$·s or more. If the amount of water permeation is within these ranges, preferable papermaking is possible from the viewpoint of productivity. If the yield percentage of the aforementioned water-insoluble components is lower than 70% by weight, not only does productivity decrease considerably, but cellulose and other water-insoluble components ends up clogging the inside of the wires and filter cloth used, and detachability of the multilayered structure following deposition becomes remarkably poor.

Here, the amount of water permeation of the wires or filter cloth at atmospheric pressure is evaluated in the manner described below.

When installing the wires or filter cloth to be evaluated in a batch-type papermaking machine (such as an automated square-type sheet machine manufactured by Kumagai Riki Kogyo Co., Ltd.), in the case of wires, the wires are used as is, while in the case of a filter cloth, the filter cloth is placed on an 80 to 120 mesh metal mesh (having hardly any water filtration resistance), an adequate amount of water (indicated as y ml) is poured into the papermaking machine having a papermaking area of x $cm^2$, and the drainage time is measured at atmospheric pressure. The amount of water permeation in the case of a drainage time of z s (seconds) is defined as $y/(xz)$ (ml/$cm^2 \cdot s$).

Examples of filters or filter cloths that can be used for extremely fine cellulose fibers include, but are not limited to, the Tetexmono DLWO7-8435-SK010 (made of PET) manufactured by Sefar AG (Switzerland), and the NT20 (made of a blend of PET and nylon) manufactured by Shikishima Canvas Co., Ltd. The multilayered structure of the present invention can also be preferably produced using an endless felt like that disclosed in Japanese Unexamined Patent Publication No. 2011-042903 as a wire belt. However, since there are cases in which the support per se has the capacity to be used as a filter cloth as previously described, the use is not limited to that described above.

During the dehydration of the papermaking step, a fine cellulose fiber concentrate in the form of a wet paper web is obtained by increasing the solid content on a preliminarily inserted support layer or within the support layer. The solid content of the wet paper web is adjusted so that the solid concentration is preferably 6% by weight to 60% by weight and more preferably 10% by weight to 50% by weight by controlling the suction pressure during papermaking (both wet suction and dry suction) and the degree of dehydration in the press step. If the solid concentration is such that the solid content is lower than 6% by weight, a large amount of energy is required for drying, making this disadvantageous in terms of production costs. In addition, vacuum dehydration requiring a considerable amount of energy is required to dehydrate to a concentration at which the solid content of the wet paper web exceeds 60% by weight, thereby making this unrealistic.

In addition, a method may also be used that consists of carrying out papermaking on filter cloth, and replacing the water in the resulting wet paper web with an organic solvent in an organic solvent replacement step followed by drying. Although this method is effective in the case of designing to have high porosity in order to improve moisture permeability, since a permeability resistance decreases in comparison with the case of not replacing with an organic solvent, the type and composition of the organic solvent is determined based on the balance between the two. The details thereof are in accordance with International Publication No. WO2006/004012.

Namely, by placing the support on a papermaking machine installed with wires or filter cloth, dehydrating a portion of the water that composes the aqueous dispersion on the support (papermaking), laminating a wet paper web of the fine cellulose fiber nonwoven fabric composed of fine cellulose fibers on the support, and integrating into a single unit, a laminated sheet can be produced that is composed of at least two layers of multilayer structures. A support having two or more layers of multilayered structures is used to produce a laminated sheet having three or more layers. In addition, a multilayered sheet having three or more layers may also be obtained by carrying out multistage papermaking on the fine cellulose fiber nonwoven fabric of the present invention having two or more layers on a support. After the multilayered structure of the present invention has been produced by papermaking, it is laminated with a different support (nonwoven fabric, porous membrane or fabric) or separately produced multilayered structure of the present invention by hot press treatment and the like and integrated into a single unit.

Here, in the case of a typical papermaking method for an aqueous dispersion, the aqueous dispersion is spread over wires at room temperature. By setting the papermaking temperature to a temperature of 30° C. to 80° C., which is higher than the normal temperature, in particular, a multilayered structure can be more stably produced that combines high permeability resistance, high moisture permeability and comparatively high thermal conductivity. In particular, if the papermaking temperature is 40° C. or higher, due to the high degree of swelling of each fine cellulose fiber, surface tension between fibers during papermaking becomes stronger, it becomes easier to adopt a densely packed structure extending to the interior of the nonwoven fabric structure, and as a result thereof, the multilayered structure is predicted to demonstrate high permeability resistance and comparatively high thermal conductivity. Although a structure similar to that of the present invention can be produced even if the temperature exceeds 80° C., quality is no longer stable since moisture of the dispersion ends up evaporating.

The multilayered structure of the present invention is obtained from the wet paper web obtained in the papermaking step by evaporating a portion of the water in the drying step that is carried out by heating. If a fixed length drying type of dryer like the drum dryer device used in the papermaking step is used in the drying step, which is able to dry water while maintaining the width at a constant length with the wet paper web sandwiched between the dryer surface and felt, a multilayered structure having high permeability resistance can be stably obtained, thereby making this preferable. Although the drying temperature is suitably selected according to the conditions, it is preferably within the range of 80° C. to 180° C. and more preferably within the range of 90° C. to 150° C. If within these ranges, the multilayered structure of the present invention can be preferably produced. If the drying temperature is lower than 80° C., since the water evaporation rate is excessively slow in many cases, adequate productivity is unable to be secured, thereby making this undesirable, while if the drying temperature exceeds 180° C., there are cases in which the hydrophilic polymer that composes the multilayered structure ends up undergoing thermal denaturation and energy efficiency, which has an effect on cost, also decreases, thereby making this undesirable. Depending on the case, multistage drying can also be carried out in which initial drying is carried out at a low drying temperature of 100° C. or lower followed by drying at a temperature of 100° C. or higher in the next stage, and this is also effective for obtaining a highly uniform multilayered structure.

Moreover, in the case of incorporating a crosslinking agent in the papermaking dispersion as an internally added additive for the purpose of waterproofing as previously described, it is important to provide a heat treatment step separate from the aforementioned drying step to allow the reaction of the crosslinking agent to proceed. Although it is naturally preferable to set to the proper reaction temperature of the crosslinking agent, since many crosslinking agents used as internally added additives react with surface hydroxyl groups and the like in an atmosphere in which water has been removed, the heat treatment temperature is 100° C. or higher, and in consideration of completing the reaction, the heat treatment temperature is 120° C. or higher and preferably 130° C. or higher.

A post-processing step in the form of a coating treatment or chemical treatment step and/or a calendering treatment step for adjusting mean thickness (which is normally carried out for the purpose of reducing thickness) are provided as necessary for the multilayered structure of the present invention obtained in the aforementioned steps.

The post-processing step is carried out to provide necessary functions by post-processing instead of internal addition. For example, in the case of producing an energy recovery ventilation sheet, a coating liquid of a prescribed moisture permeability agent or flame retardant having the previously described contents (which may consist of an aqueous system or organic solvent system) is prepared followed by spray coating or coating in a step employing a printing method or coating method and the like and drying. In the case of chemical treatment, the reaction is allowed to proceed by carrying out heat treatment in the same manner as an internal addition method following the drying step.

In addition, if a calendering treatment step is provided for smoothing or reducing thickness of the multilayered structure obtained in the aforementioned drying step with a calendering device, a multilayered structure having a mean thickness of 15 µm to 30 µm can be stably produced as a preferred embodiment of the present invention. Namely, by including a step for carrying out smoothing treatment on the multilayered structure after drying with a calendering device, the thickness of the multilayered structure can be reduced and the multilayered structure of the present invention can be provided comprising a fine cellulose fiber nonwoven fabric layer having the combination of mean thickness, air permeability and strength over a wide range. For example, a multilayered structure can be easily produced that has a mean thickness of 30 µm or less (lower limit of about 3 µm) when set to an overall basis weight of 30 g/m² or less. As a result of the calendering treatment step, extremely minute holes in the layer composed of fine cellulose fibers of the present invention are filled in, pore diameter size is averaged, and air permeation performance in terms of permeability resistance and moisture permeability are stabilized significantly. In addition to ordinary calendering devices using a single press roll, super calendering devices having a structure in which these are arranged in multiple stages may also be used for the calendering device. A multilayered structure having superior performance as an energy recovery ventilation sheet can be provided by selecting these devices corresponding to the particular purpose along with the materials (according to material hardness) on both sides of the rolls and the linear pressure during calendering treatment. For example, a multilayered structure having mean thickness within the previously described ranges can be preferably produced by combining a metal roll and a high hardness plastic roll, a metal roll and a cotton roll, or a metal roll and an aramid roll for the roll materials.

By satisfying the aforementioned conditions, a multilayered structure comprising a nonwoven fabric layer composed of fine cellulose fibers can be provided, and an energy recovery ventilation sheet can be provided that is composed of the multilayered structure.

As a result of an energy recovery ventilator that uses a energy recovery ventilation element, in which the energy recovery ventilation sheet of the present invention is used as a partitioning material that partitions two types of air of different temperature, humidity or both, easily conducting sensible heat due to the high moisture permeability and thermal conductivity of the energy recovery ventilation sheet of the present invention, not being covered with a thick film, and only partitioning air with a nonwoven fabric structure that only has a thin film or holes that are filled in, it demonstrates superior heat exchange capacity. Moreover, since the partitioned closed portions are thin, moist air is able to permeate more easily than conventional energy recovery ventilation sheets, thereby enhancing the effect of retaining humidity.

An example of a specific method for using the aforementioned energy recovery ventilation element is a energy recovery ventilator that combines the energy recovery ventilation element with a supply fan and a discharge fan. Supplied air in the form of outside air and the like is drawn into the energy recovery ventilation element by the supply fan where it contacts the energy recovery ventilation sheet incorporated within the energy recovery ventilation element. On the other hand, discharged air in the form of indoor air and the like is drawn into the energy recovery ventilation element by the discharge fan where it similarly contacts the energy recovery ventilation sheet.

Supplied air and discharged air that have made contact through the energy recovery ventilation sheet undergo heat exchange by demonstrating the behavior of either supply or discharge corresponding to the temperature and humidity. Supplied air that has undergone heat exchange is blown into the supply fan and is taken into a room, for example. On the other hand, discharged air that has undergone heat exchange is blown into the discharge fan and is discharged outside, for example.

When heat exchange is carried out using a heat exchanger provided with one or a plurality of energy recovery ventilation elements in the form of an energy recovery ventilation element using the multilayered nonwoven fabric of the present invention for the energy recovery ventilation sheet, heat exchange can be carried out efficiently, and the effectiveness of an energy recovery ventilator that maintains thermal effects by cooling and heating can be further enhanced while suppressing the discharge of heat or cold within the building and carrying out ventilation by discharging interior air containing volatile organic compounds and having increased levels of carbon dioxide.

EXAMPLES

The following provides a detailed explanation of the present invention by listing examples thereof.

Furthermore, the main measured values of physical properties were measured using the methods indicated below.

(1) Mean Fiber Diameter of Fine Cellulose Fibers

Three locations on the surface of the multilayered structure composed of fine cellulose fibers are randomly observed with a scanning electron microscope (SEM) at a magnification factor equivalent to 10000× to 100000× corresponding to the fiber diameter of the fine fibers. Lines are drawn on the screen in the horizontal direction and vertical direction for the resulting SEM images, and the fiber diameters of fibers intersecting with the lines are measured from enlarged images followed by counting the number of intersecting fibers and the fiber diameter of each fiber. The number average fiber diameter is then calculated using the results of two sets of measurements in the vertical and horizontal directions for each image, and the results for a total of three images are averaged and used as the mean fiber diameter of the target sample.

(2) Basis Weight (Weight Per Unit Area)

Evaluation of basis weight W (g/m$^2$) of the multilayered structure is calculated in compliance with JIS P-8124.

(3) Mean Thickness (μm)

A humidified multilayered structure was measured for thickness at 10 locations in the direction of width for each sheet with an automatic micrometer manufactured by Hi-Bridge Co., Ltd. followed by using the mean value thereof as the mean thickness of the multilayered structure.

(4) Density (g/cm$^3$)

Density of the multilayered structure was calculated in accordance with the following equation from the aforementioned basis weight W and the mean thickness D.

$$\text{Density (g/cm}^3) = W/D$$

(5) Permeability Resistance (sec/ml)

The area of a multilayered structure measuring 25 cm on a side was divided into 10 equal portions and permeability resistance was measured using an Oken-type permeability resistance tester (Model EG01, Asahi Seiko Co., Ltd.) for the 10 divisions followed by taking the average of the 10 locations and using the resulting value as the permeability resistance for air of the sample.

(6) Tensile Strength

Tensile strength was evaluated in accordance with the method defined in JIS P 8113, and 10 samples having a width of 15 mm were measured using the desktop horizontal tensile tester (No. 2000) manufactured by Kumagai Riki Kogyo Co., Ltd. followed by using the resulting average value as the value of tensile strength.

(7) Moisture Permeability

Moisture permeability (g/m$^2$·24 hr) per 24 hours, as determined by measuring at 90% relative humidity (RH) in an environment in which air was circulated at 40° C. according to Method A-1 described in JIS L 1099, was measured as initial moisture permeability for each multilayered structure.

(8) Thermal Conductivity (W/m/K)

Nonwoven fabric structures respectively cut out to a size of 100 mm×100 nm were placed between test plates (50 mm×50 mm) at a temperature of 29.9° C. for the upper plate and a temperature of 22.3° C. for the lower plate in an atmosphere at a room temperature of 20° C. and relative humidity of 65%, followed by measuring heat flow for 60 seconds using the KES-F7 Thermo Labo II precision high-speed thermal property measuring system manufactured by Kato Tech Co., Ltd. and calculating thermal conductivity from that value.

(9) Durability

After measuring moisture permeability of the multilayered structure, the multilayered structure was held for 1 hour at 25° C. and 50% RH followed by placing the multilayered structure in a fixed length frame and storing the multilayered structure for 48 hours in a desiccator set to a temperature of 30° C. and humidity of 99% or more for a fixed area. Subsequently, after holding for 1 hour at 25° C. and 50% RH for each fixed length frame, the multilayered structure was removed from the fixed length frame, moisture permeability was measured following the same procedure as described in (7) above, and moisture permeability after high temperature hysteresis was used as an indicator to evaluate moisture permeability durability of the energy recovery ventilation sheet.

Example 1

Cotton linter pulp was immersed in water to a concentration of 10% by weight followed by subjecting to heat treatment for 4 hours in an autoclave at 130° C. and repeatedly rinsing the resulting swollen pulp with water to obtain swollen pulp immersed in water.

The swollen pulp was dispersed in water to a solid content of 1.5% by weight to obtain an aqueous dispersion (400 L) followed by proceeding with beating treatment for 20 minutes on the 400 L of aqueous dispersion using a disk refiner in the form of the Model SDR14 Labo, Refiner (pressurized disk type) manufactured by Aikawa Iron Works Co., Ltd. at a disk clearance of 1 mm, and continuing with beating treatment under conditions such that the clearance was subsequently reduced to nearly zero. When samples were taken over time and evaluated according to the Canadian standard freeness (abbreviated CSF) test for pulp as defined in JIS P 8121 to determine CSF values, CSF values were determined to decrease over time, and when beating treatment was continued further once the CSF values had approached zero, they were confirmed to demonstrate an increasing trend. Beating treatment was further continued under the aforementioned conditions to obtain a beaten slurry having a CSF value of 73 ml↑. The resulting beaten slurry was then subjected to five rounds of downsizing treatment at an operating pressure of 100 MPa using a high-pressure homogenizer (Model NS015H manufactured by GEA Niro Soavi) to obtain aqueous dispersion M1 of fine cellulose fibers (solid concentration: 1.5% by weight). Next, M1 was diluted with water to lower the solid concentration of 0.1% by weight followed by dispersing for 4 minutes at room temperature with a home mixer to prepare a papermaking dispersion.

Cupra rayon nonwoven fabric (trade name: Bemliese® TN150, Asahi Kasei Fibers Corp., basis weight: 15 g/m$^2$, thickness: 50 μm, density: 0.28 g/cm$^3$, mean single fiber fineness: 0.2 dtex) was used for the base material, and papermaking was carried out by laminating a fine cellulose fiber layer thereon. Namely, a plain woven PET/nylon blend (NT20, Shikishima Canvas Co., Ltd., moisture permeation at 25° C.: 0.03 ml/cm$^2$ s) was placed as a filter cloth in a batch-type papermaking machine (automated square-type sheet machine, Kumagai Hiki Kogyo Co., Ltd., papermaking area: 25 cm×25 cm, 80 mesh), the aforementioned cupra rayon nonwoven fabric was placed thereon, and the papermaking dispersion prepared as described above was added in an equivalent amount based on the formation of a cellulose nonwoven fabric layer having a basis weight of 10 g/cm$^2$ followed by carrying out papermaking (dehydration) at a degree of vacuum of 4 KPa relative to atmospheric pressure. The same filter cloth was placed over the resulting two-layer wet paper web formed on the filter cloth and with the wet paper web clamped from both sides, the wet paper web was pressed for 1 minute at a pressure of 1 kg/cm$^2$, followed by contacting with the drum surface of a drum dryer set to a surface temperature of 130° C. while in the form of three layers consisting of the filter cloth, wet paper web and the other filter cloth and drying for about 120 seconds. The filter cloths were able to be easily detached from both sides of the resulting three-layer sheet to obtain dried sample S1. Although S1 has a double layered structure as previously described, the tensile strength when completely integrated into a single unit was 1.4 kg/15 mm, thereby indicating it to be a sheet-like structure having adequate strength (basis weight: 25 g/m$^2$)

Figure 2:
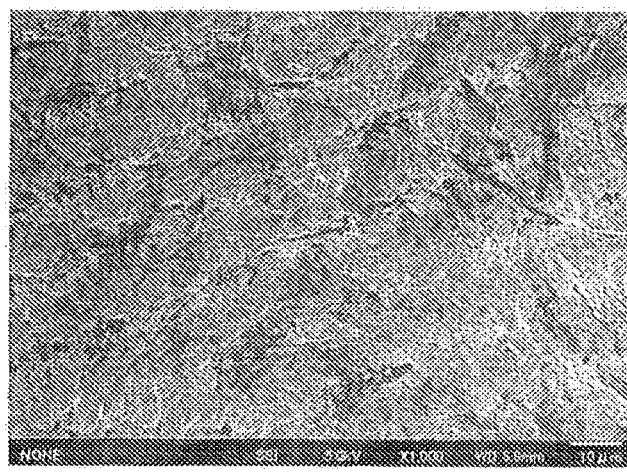
FIG. 2 is an SEM image (Example 1, magnification factor: 1000×) of the top surface (fine cellulose fiber layer) of the multilayered structure of the present invention.
Figure 3:
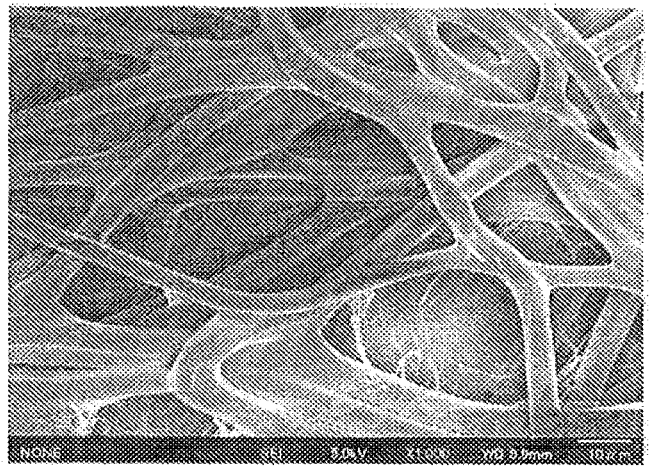
FIG. 3 is an SEM image (Example 1, magnification factor: 1000×) of the back surface (support layer) of the multilayered structure of the present invention.
Figure 4:
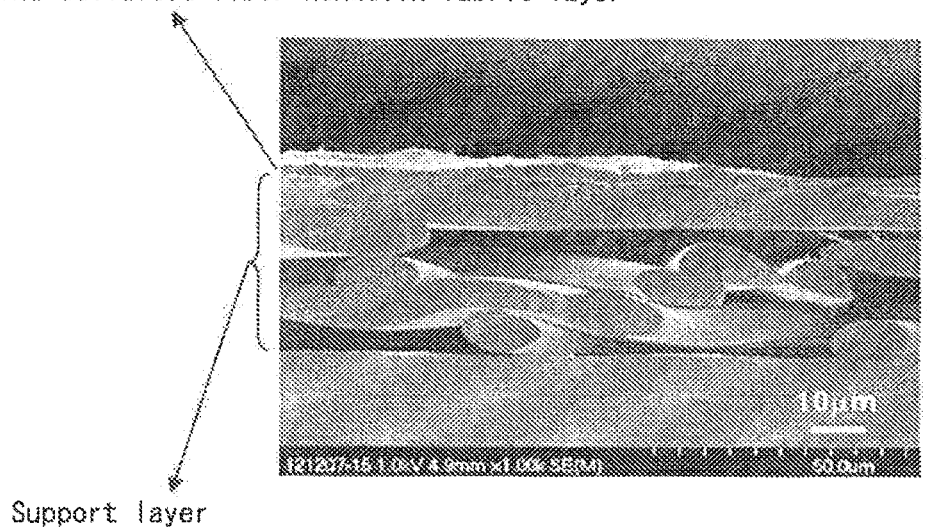
FIG. 4 is an SEM image (Example 6, magnification factor: 1000×) of a cross-section of the multilayered structure of the present invention.

When the surface of the fine fiber layer side of S1 was subjected to SEM image analysis at a magnification factor of 10000×, the number average fiber diameter of the fine cellulose fibers on the surface of the fine cellulose fibers was 104 nm. FIGS. 2 and 3 respectively show SEM images of the top surface (fine fiber layer side) and back surface (support layer side) of S1. The patterns of the two are clearly different, and a laminated structure was determined to have been formed. In addition, the thickness of the fine cellulose fiber nonwoven fabric layer of S1 as determined from a cross-sectional SEM image was 7.1 μm. An investigation of the physical properties of S1 and its suitability for use as an energy recovery ventilation sheet revealed that it has high performance (high moisture permeability and high durability) as an energy recovery ventilation sheet as indicated in the following Table 1.

Examples 2 to 4

Papermaking and drying were carried out using the aqueous dispersion slurry M1 of fine cellulose fibers prepared in Example 1 and under exactly the same conditions as Example 1 with the exception of forming a fine cellulose fiber layer equivalent to a basis weight of 5 g/m² on the cupra rayon nonwoven fabric used in Example 1 to obtain an integrated sheet-like structure S2 (basis weight: 20 g/m²) having double layered structures (Example 2). Although S2 had a lower basis weight of the fine cellulose fiber layer in comparison with S1, it had a tensile strength of 1.1 kg/15 mm, indicating adequate strength for handling. The thickness of the fine cellulose nonwoven fabric layer of S2 as determined from a cross-sectional SEM image was 3.6 μm.

Next, calendering treatment (using a roll press manufactured by Yuriroll Co., Ltd.) was carried out on S1 and S2 an in attempt to reduce thickness. A metal roll was used for the upper roll, an aramid roll (hardness: 129) was used for the lower roll, and calendering treatment was carried out at a linear pressure of 2.0 tons/20 cm and traveling speed of 2 m/min to obtain samples S3 (Example 3) and S4 (Example 4), respectively. The thicknesses of the fine cellulose nonwoven fabric layer of S3 and S4 were 6.9 μm and 3.5 μm, respectively. Investigation of the suitability of S2 to S4 as energy recovery ventilation sheets revealed that they have high performance (high moisture permeability and high durability) as energy recovery ventilation sheets as indicated in the following Table 1. In the cases of S3 and S4 in particular, since calendering treatment resulted in an increase in permeability resistance and improvement of fluctuations in physical properties, while also imparting improvement of thermal conductivity based on reducing membrane thickness, they were clearly determined to demonstrate higher suitability for use as energy recovery ventilation sheets.

Examples 5 and 6

Abaca hemp pulp was immersed in water to a concentration of 10% by weight followed by carrying out heat treatment for 4 hours at 130° C. in an autoclave and repeatedly rinsing the resulting swollen pulp with water to obtain swollen pulp impregnated with water.

The swollen pulp was dispersed in water to a solid content of 1.5% by weight to obtain an aqueous dispersion (400 L) followed by carrying out beating (beating to a CSF value of 588 ml↑) and downsizing treatment in the same manner as Example 1 to obtain an aqueous dispersion M2 of fine cellulose fibers (solid concentration: 1.5% by weight). Subsequently, dilution with water from M2 and dispersion were carried out using the same procedure as Example 1 to prepare a papermaking dispersion (solid content percentage: 1.5% by weight) followed by carrying out papermaking such that the basis weight of the fine cellulose fiber layer on the cupra rayon base material was 5 g/m², and carrying out pressing and drying in the same manner as Example 1, to obtain a sample S5 (Example 5) having tensile strength of 1.3 kg/15 mm indicating adequate strength for handling.

Moreover, calendering treatment was carried out on S5 under the same conditions as Example 3 and Example 4 to obtain a sample S6 (Example 6) having tensile strength of 1.4 kg/15 mm indicating adequate strength for handling.

When the surface of the fine fiber layer side of S5 was subjected to SEM image analysis at a magnification factor of 10000×, the number average fiber diameter of the fine cellulose fibers on the surface of the fine cellulose fibers was 45 nm. The thicknesses of the fine cellulose fiber nonwoven fabric layer of S5 and S6 were both 3.3 μm. An investigation of the suitability of S5 and S6 for use as energy recovery ventilation sheets revealed that the multilayered structures thereof have high performance (high moisture permeability and high durability) as energy recovery ventilation sheets as indicated in the following Table 1.

Example 7

Downsizing treatment, dispersion preparation, papermaking, drying and calendering treatment were carried out in the same manner as Example 6 with the exception of drying after replacing the organic solvent with isobutyl alcohol containing 50% water following press treatment of the wet paper web to obtain a sample S7 (Example 7). The thickness of the fine cellulose nonwoven fabric layer of S7 was 5.6 μm. S7 has high performance (high moisture permeability and high durability) as an energy recovery ventilation sheet as indicated in the following Table 1.

Example 8

After carrying out downsizing treatment and preparation of the papermaking dispersion in the same manner as Example 1 and stirring the dispersion for 10 minutes at 50° C., the dispersion was immediately poured into the batch-type papermaking machine used in Example 1 and press treatment and drying were carried out using the same procedures as Example 1 to obtain a multilayered structure S8 (Example 8). The thickness of the fine cellulose nonwoven fabric layer of S8 was 6.9 μm, and the thickness of the fine cellulose fiber layer was slightly less than S1 obtained by carrying out papermaking under the same conditions at room temperature. As indicated in the following Table 1, the multilayered structure was able to be suitably used as an energy recovery ventilation sheet. Although S8 was fabricated under the same conditions as Example 1 with the exception of the papermaking temperature, in comparison with S1 obtained in Example 1, it demonstrated higher permeability resistance, higher moisture permeability and had functions that were superior in terms of suitably for use as an energy recovery ventilation sheet.

Example 9

First, a hydro-entangled nonwoven fabric having a basis weight of 20 g/m² was fabricated for use as a support layer by subjecting a semi-random cut web composed of rayon fibers having a fiber length of 40 μm and fineness of 1.7 dtex to hydro-entangling treatment. The thickness of this rayon short fiber nonwoven fabric was 100 μm. A fine cellulose fiber layer was laminated at a basis weight of 10 g/m² on the rayon short fiber nonwoven fabric under exactly the same conditions as Example 1 with the exception of using the rayon short fiber nonwoven fabric instead of the cupra rayon nonwoven fabric used in Example 1 to obtain a multilayered structure S9 (Example 9) demonstrating superior handling as a result of having tensile strength of 1.2 kg/15 mm. The thickness of the fine cellulose nonwoven fabric layer of S9 was 7.2 μm. The multilayered structure was able to be suitably used as an energy recovery ventilation sheet as indicated in the following Table 1.

Example 10

The slurry having a CSF value of 73 ml↑ obtained by beating the linter pulp in Example 1 was diluted with water to a fiber concentration of 0.08% by weight followed by subjecting to dispersion treatment for 4 minutes at room temperature with a home mixer to obtain a papermaking dispersion. Using this papermaking dispersion, papermaking was first carried out at a designed basis weight of 20 g/m² using the same procedure as Example 1 followed by press treatment and drying to first fabricate a short fiber nonwoven fabric composed of natural cellulose fibers. Moreover, a fine cellulose fiber layer was laminated at a basis weight of 10 g/m² onto the rayon short fiber nonwoven fabric under exactly the same conditions as Example 1 with the exception of using the short fiber nonwoven fabric composed of natural cellulose fibers instead of the cupra rayon nonwoven fabric used in Example 1 to obtain a multilayered structure S10 (Example 10) demonstrating superior handling as a result of having tensile strength of 0.9 kg/15 mm. The thickness of the fine cellulose nonwoven fabric layer of S10 was 7.1 μm. The multilayered structure was able to be suitably used as an energy recovery ventilation sheet as indicated in the following Table 1.

Examples 11 and 12

The two types of multilayered structures S2 and S6 fabricated in Example 2 and Example 6 were respectively subjected to hydrophilic treatment to fabricate samples coated with lithium chloride. A suitable amount of 5% by weight aqueous lithium chloride solution was uniformly spray-coated onto the respective surfaces of the fine cellulose fiber nonwoven fabric layers of S2 and S6 followed by drying for 10 minutes in a dryer at 100° C. while immobilized in a fixed length frame. The multilayered structures coated with lithium chloride obtained from S2 and S6, respectively, were designated as S11 and S12. The adhered amounts of lithium chloride contained in S11 and S12 as calculated from the change in dry weight before and after coating treatment were 5% by weight in both cases. Although S11 and S12 have two-layer laminated structures, their tensile strengths were 1.1 kg/15 mm and 1.8 kg/15 mm, respectively, and were both determined to be sheet-like structures having adequate strength (basis weight: 23 g/m², and 3 g/m² of the basis weight was attributable to the amount of lithium chloride and water contained in the coating layer). The resulting multilayered structures were able to be suitably used as total heat exchanger sheets as indicated in the following Table 1. In particular, the samples subjected to hydrophilic treatment both demonstrated high levels of moisture permeability as compared with S2 and S6 that were not subjected to hydrophilic treatment, and although they demonstrated higher suitability (higher moisture permeability) for use as energy recovery ventilation sheets, they were also determined to have problems from the viewpoint water permeability durability.

Example 13

Hydrophilic treatment was carried out on S6 fabricated in Example 6 to fabricate a sample in which lithium chloride was dispersed and immobilized in a water-soluble polymer coating film. First, ultra-high-molecular weight polyethylene glycol in the form of Alkox E-60 manufactured by Meisei Chemical Works, Ltd. was used for the water-soluble polymer, an aqueous solution was prepared having a lithium chloride concentration of 10% by weight and E-60 concentration of 1% by weight, the surface of S6 was immobilized on a glass plate so as to become a fine cellulose fiber nonwoven fabric layer, and the aqueous solution was suitably coated thereon using an applicator to obtain a multilayered structure S13 of the present invention by drying using the same procedure as Example 11. The amounts of lithium chloride and E-60 contained in S13 as calculated from the change in dry weight before and after hydrophilic treatment were 5% by weight and 0.5% by weight, respectively. Although S13 has a double layered structure, it was determined to be a sheet-like structure having adequate strength as a result of having tensile strength of 1.2 kg/15 mm (basis weight: 23 g/cm², and 3 g/m² of the basis weight was attributable to the amount of lithium chloride, E-60 and water contained in the coating layer). The resulting multilayered structure was able to be suitably used as an energy recovery ventilation sheet as indicated in the following Table 1. In particular, each of the samples subjected to hydrophilic treatment demonstrated higher moisture permeability in comparison with S6 that was not subjected to hydrophilic treatment, and demonstrated higher suitability for use as the energy recovery ventilation sheet of the present invention. From the viewpoint of the durability of moisture permeability as well, S13 demonstrated an improved moisture permeability reduction rate as compared with S12 that was only coated with lithium chloride, and was determined to be a superior sheet in terms of suitability for use as an energy recovery ventilation sheet in comparison with S12.

Examples 14 and 15

The aqueous dispersion M1 prepared in Example 1 was diluted with water to make the concentration of fine cellulose fibers 0.1% by weight, and after dispersing for 4 minutes at room temperature with a home mixer, a suitable amount of an emulsion-type aqueous dispersion of a blocked polyfunctional isocyanate (BI) in the form of Meikaneto WEB manufactured by Meisei Chemical Works, Ltd. was added as waterproofing agent (crosslinking agent) to a BI concentration of 0.005% by weight followed by gently stirring for 3 minutes to prepare a papermaking dispersion A. Similarly, the aqueous dispersion M2 prepared in Example 5 was diluted with water to a fine cellulose fiber concentration of 0.1% by weight to prepare a dispersion, and after dispersing for 4 minutes at room temperature with a home mixer, a suitable amount of Meikaneto WEB was added to a BI concentration of 0.005% by weight followed by gently stirring for 3 minutes to prepare a papermaking dispersion B. Papermaking and drying were respectively carried out on the papermaking dispersion A and papermaking dispersion B using the same procedure as that indicated in Example 2 based on the formation of a fine cellulose nonwoven fabric layer having a basis weight of 5 g/m to obtain two types of dry sheets. Next, the two types of dry sheets were attached to fixed length frames and subjected to heat treatment for 2 minutes in an oven set to 160° C. to allow a crosslinking reaction to proceed between hydroxyl groups on the surface of the cellulose by the isocyanate. Following heat treatment, the sheets were removed from the fixed length frames at room temperature to obtain two types of multilayered structures of the present invention. The multilayered structures respectively obtained from papermaking dispersion A and papermaking dispersion B were designated as S14 (Example 14) and S15 (Example 15), respectively. Although S14 and S15 have double layered structures, their tensile strengths were 1.6 kg/15 mm and 1.8 kg/15 mm, respectively, and were both sheet-like structures having adequate strength (basis weight: 21 g/m$^2$ in both cases). The resulting two types of multilayered structures were able to be suitably used as energy recovery ventilation sheets as indicated in the following Table 1. In addition, in contrast to S2 and S6, which respectively correspond to samples of S14 and S15 that did not undergo waterproofing treatment, being sheets that were absent of moisture resistance to the extent that their structures easily collapsed in water so that they were unable to be evaluated for wet strength, when the wet strengths of S14 and S15 were evaluated by measuring the tensile strength of wet samples (in compliance with (6)), their wet strengths were determined to be 0.52 kg/15 mm and 0.59 kg/15 mm, respectively, and were determined to be multilayered structures of the present invention that are able to be used even in wet environments.

Examples 16 and 17

In the preparation of papermaking dispersion A in Example 14, a waterproofing agent (crosslinking agent) in the form of BI was added and gently stirred for 3 minutes to obtain a hydrophilic agent followed by adding 0.01% by weight of trimethylglycine in the form of Aminocoat™ manufactured by Asahi Kasei Chemicals Corp. and again gently stirring for 3 minutes to prepare papermaking dispersion C. Subsequently, papermaking, drying and heat treatment were carried out according to exactly the same procedure as Example 14 using the papermaking dispersion C based on the formation of a fine cellulose nonwoven fabric layer having a basis weight of 5 g/cm$^2$ to obtain a multilayered structure S16 (Example 16) of the present invention.

Similarly, in the preparation of papermaking dispersion A in Example 14, a waterproofing agent in the form of BI was added and gently stirred for 3 minutes to obtain a hydrophilic agent followed by adding 0.01% by weight of a cationic water-soluble polymer in the form of Aronfloc® C-508 manufactured by MT Aquapolymer Inc. and again gently stirring for 3 minutes to prepare papermaking dispersion D. Subsequently, papermaking, drying and heat treatment were carried out according to exactly the same procedure as Example 14 using the papermaking dispersion D based on the formation of a fine cellulose nonwoven fabric layer having a basis weight of 5 g/cm$^2$ to obtain a multilayered structure S17 (Example 17) of the present invention. Although S16 and S7 have double layered structures, their tensile strengths were 1.4 kg/15 mm and 1.7 kg/15 mm, respectively, and were both sheet-like structures having adequate strength (basis weight: 22 g/m$^2$ (S16) and 23 g/m$^2$ (S17)). The multilayered structures were able to be suitably used as total heat exchanger sheets as indicated in the following Table 1. In particular, the two types of hydrophilic agents were thought to have accumulated on the surface of the fine cellulose fibers, and then become immobilized on the surface layer and interior of the fine cellulose fiber layer as a result of subsequent papermaking, thereby resulting in increased moisture permeability and favorable durability as compared with S14 that merely underwent waterproofing treatment only. Moreover, since the wet tensile strengths of S16 and S17 are 0.48 kg/15 mm and 0.49 kg/15 mm, respectively, they are both multilayered structures that can also be used in wet environments.

Example 18

An oily agent of Tencel® cut fibers (length: 3 mm) supplied by Lenzing Fibers Corp. was washed several times in water containing a surfactant to adequately remove the oily agent and obtain short raw fibers containing water.

The short raw fibers were dispersed in water to a concentration of 1.5% by weight to obtain an aqueous dispersion (400 L) followed by carrying out beating (beating to a CSF value of 90 ml↑) and downsizing treatment in the same manner as Example 1 to obtain an aqueous dispersion M3 of fine cellulose fibers (solid concentration: 1.5% by weight). Next, dispersion M2 prepared in Example 5 and dispersion M3 were mixed so that the weight ratio of the fine cellulose fibers contained in dispersion M2 and the fine cellulose fibers contained in dispersion M3 was 50:50 followed by further diluting with water to a solid concentration of 0.15% by weight and dispersing for 4 minutes at room temperature with a home mixer to prepare a papermaking dispersion.

Papermaking was carried out so that the basis weight of the fine cellulose fiber layer on the cupra rayon base material was 5 g/m$^2$ followed by carrying out pressing and drying in the same manner as Example 1 to obtain a sample S18 (Example 18) having adequate strength for handling as a result of having tensile strength of 1.1 kg/15 μm.

When the surface of the fine fiber layer side of S18 was subjected to SEM image analysis at a magnification factor of 10000×, the number average fiber diameter of the fine cellulose fibers on the surface of the fine cellulose fibers was 273 nm. The thickness of the fine cellulose nonwoven fabric layer of S18 was 6.2 μm. An investigation of the suitability of S18 as an energy recovery ventilation sheet revealed that the multilayered structure has high performance (high moisture permeability and high durability) as a energy recovery ventilation sheet as indicated in the following Table 1.

Examples 19 and 20

Multilayered structures 319 (Example 19) and S20 (Example 20) of the present invention were respectively obtained according to exactly the same procedure as Examples 1.4 and 16 with the exception of changing the support obtained by laminating fine cellulose fiber nonwoven fabric layers in Examples 14 and 16 from TN150 to Nylon Spunbond N05020 manufactured by Asahi Kasei Fibers Corp. Although S19 and S20 have double layered structures, they were determined to be sheet-like structures (basis weight: 21 g/m$^2$ (S19), 22 g/m (S20)) having adequate strength as a result of having tensile strengths of 2.0 kg/15 mm and 1.9 kg/15 mm, respectively. In addition, since the wet tensile strengths of S19 and S20 were 1.9 kg/15 mm and 1.7 kg/15 mm, respectively, they are both multilayered structures that can be used in wet environments. Both samples are able to be used as energy recovery ventilation sheets as indicated in the following Table 1.

Example 21

An energy recovery ventilation sheet subjected to flame retardation treatment and having a flame retardant content of 22.9% by weight was obtained by immersing multilayered structure S4 obtained in Example 4 in a 20% by weight aqueous solution of a guanidine sulfaminate-based flame retardant in the form of Apinon-101 manufactured by Sanwa Chemical Co., Ltd. and drying. As a result of carrying out an incombustibility test on this sheet in accordance with the Testing Method for Incombustibility of Thin Materials for Buildings of JIA A 1322 and measuring char length, remaining flame and afterglow, the sheet was determined to have Grade 2 Incombustibility. Furthermore, the physical properties of this sample 21 (Example 21) of a multilayered structure subjected to flame retardation treatment are shown in the following Table 1. S21 was able to be suitably used as an energy recovery ventilation sheet.

strengths of 0.9 kg/15 mm and 1.1 kg/15 mm, respectively, that allowed them to be handled, neither demonstrated favorable sheet uniformity referred to as texture, and had problems in terms of quality stability. The results indicated in the following Table 2 were obtained when evaluated for suitability for use as energy recovery ventilation sheets. Since both R1 and R2 do not contain the prescribed layer composed of fine cellulose fibers, they have the problem of being unable to demonstrate large permeability resistance, and even in the case of R2, in which permeability resistance was enhanced as a result of increasing density by calendering treatment, permeability resistance was lower than that in any of the examples. Namely, both of the samples were clearly determined to be inferior to each of the samples

TABLE 1

| | Basis weight* g/m² | Mean fiber diameter** Nm | Thickness μm | Fine cellulose fiber layer thickness μm | Density*** g/cm³ | Permeability resistance sec/100 ml | Moisture permeability (initial) g/m²/24 hr | Moisture permeability (after high-temperature hysteresis) g/m²/24 hr | Thermal conductivity W/m/K |
|---|---|---|---|---|---|---|---|---|---|
| Example 1 | 15 + 10 | 104 | 73 | 7.1 | 0.342 | 2.21 × 10⁴ | 3.9 × 10³ | 3.8 × 10³ | 0.043 |
| Example 2 | 15 + 5 | 104 | 62 | 3.6 | 0.323 | 0.73 × 10⁴ | 7.0 × 10³ | 7.0 × 10³ | 0.056 |
| Example 3 | 15 + 10 | 104 | 30 | 6.9 | 0.833 | 4.26 × 10⁴ | 3.7 × 10³ | 3.6 × 10³ | 0.064 |
| Example 4 | 15 + 5 | 104 | 25 | 3.5 | 0.800 | 1.25 × 10⁴ | 6.8 × 10³ | 6.8 × 10³ | 0.064 |
| Example 5 | 15 + 5 | 45 | 53 | 3.3 | 0.345 | 6.78 × 10⁴ | 6.9 × 10³ | 6.8 × 10³ | 0.071 |
| Example 6 | 15 + 5 | 45 | 26 | 3.3 | 0.769 | >10.0 × 10⁴ | 6.8 × 10³ | 7.0 × 10³ | 0.069 |
| Example 7 | 15 + 5 | 45 | 26 | 5.6 | 0.769 | 1.02 × 10⁴ | 9.0 × 10³ | 9.1 × 10³ | 0.070 |
| Example 8 | 15 + 10 | 104 | 68 | 6.9 | 0.368 | 2.61 × 10⁴ | 4.2 × 10³ | 4.1 × 10³ | 0.057 |
| Example 9 | 20 + 10 | 104 | 110 | 7.2 | 0.273 | 0.66 × 10⁴ | 4.5 × 10³ | 4.3 × 10³ | 0.039 |
| Example 10 | 20 + 10 | 104 | 42 | 7.1 | 0.714 | 1.82 × 10⁴ | 4.6 × 10³ | 4.6 × 10³ | 0.061 |
| Example 11 | 15 + 5 | 104 | 65 | 3.8 | 0.365 | 0.78 × 10⁴ | 10.8 × 10³ | 8.0 × 10³ | 0.065 |
| Example 12 | 15 + 5 | 45 | 28 | 3.4 | 0.821 | >10.0 × 10⁴ | 10.2 × 10³ | 7.6 × 10³ | 0.068 |
| Example 13 | 15 + 5 | 45 | 28 | 3.5 | 0.821 | >10.0 × 10⁴ | 10.0 × 10³ | 9.6 × 10³ | 0.066 |
| Example 14 | 15 + 5 | 104 | 57 | 3.7 | 0.368 | 1.20 × 10⁴ | 8.4 × 10³ | 8.3 × 10³ | 0.053 |
| Example 15 | 15 + 5 | 45 | 55 | 3.4 | 0.382 | 3.03 × 10⁴ | 6.9 × 10³ | 6.9 × 10³ | 0.055 |
| Example 16 | 15 + 5 | 104 | 60 | 4.0 | 0.367 | 1.46 × 10⁴ | 7.8 × 10³ | 7.6 × 10³ | 0.045 |
| Example 17 | 15 + 5 | 45 | 58 | 3.5 | 0.397 | 5.22 × 10⁴ | 8.7 × 10³ | 8.7 × 10³ | 0.046 |
| Example 18 | 15 + 5 | 273 | 62 | 6.2 | 0.323 | 1.10 × 10⁴ | 9.2 × 10³ | 9.2 × 10³ | 0.032 |
| Example 19 | 20 + 5 | 104 | 103 | 3.8 | 0.204 | 0.60 × 10⁴ | 8.5 × 10³ | 8.5 × 10³ | 0.029 |
| Example 20 | 20 + 5 | 104 | 106 | 4.0 | 0.208 | 0.72 × 10⁴ | 9.8 × 10³ | 9.7 × 10³ | 0.032 |
| Example 21 | 15 + 5 | 104 | 53 | 3.7 | 0.489 | 1.56 × 10⁴ | 6.4 × 10³ | 6.4 × 10³ | 0.066 |

*Total A + B when basis weights of the base material (support) and fine fiber layer are defined as A and B, respectively, in the case of a double layered sheet, excluding basis weights attributable to each treatment agent.
**Refers to the mean fiber diameter of the fine cellulose fiber layer.
***Density as calculated from overall basis weight, including various treatment agents.

Comparative Examples 1 and 2

The slurry having a CSF value of 73 ml↑ obtained by beating the linter pulp of Example 1 in the same manner as Example 10 was diluted with water to a fiber concentration of 0.08% by weight followed by carrying out dispersion treatment for 4 minutes at room temperature with a home mixer to obtain a papermaking dispersion. Papermaking was first carried out using this papermaking dispersion at a designed basis weight of 20 g/m² using the same procedure as Example 1 followed by press treatment and drying to obtain a short fiber nonwoven fabric sample R1 (Comparative Example 1) composed of natural cellulose fibers.

Next, calendering treatment was carried out on R1 under the same calendering treatment conditions as those described in Example 3 to obtain a sample R2 (Comparative Example 2). When an SEM image of the surface of R1 was observed, a mixture of fibers having a fiber diameter of several μm to 10 μm or more and fibers having a fiber diameter of 200 nm or less was observed to be present, and values for mean fiber diameter differed greatly for each image, thereby making it difficult to make a quantitative determination. In addition, although R1 and R2 had tensile indicated in the aforementioned Examples 1 to 20 in terms of suitability for use as energy recovery ventilation sheets.

Comparative Example 3

Three layers of cupra rayon nonwoven fabric used as a base material in Example 1 (Bemliese® TN150, Asahi Kasei Fibers Corp., basis weight: 15 g/m², thickness: 50 μm, density: 0.28 g/cm³, mean single fiber fineness: 0.2 dtex) were superimposed followed by carrying out calendering treatment under the same calendering treatment conditions as described in Example 3 to obtain a sample R3 (Comparative Example 3). When the suitability of R3 for use as an energy recovery ventilation sheet was evaluated, the results indicated in the following Table 2 were obtained. Since R3 does not contain a prescribed layer composed of fine cellulose fibers, it varies greatly from the prescribed permeability resistance, and was unable to be suitably used as an energy recovery ventilation sheet in terms of being able to separate intake air and exhaust air.

Comparative Examples 4 and 5

Coniferous kraft pulp (NBKP) was dispersed in water to a concentration of 2.5% by weight to obtain an aqueous dispersion (400 L) followed by proceeding with beating treatment for about 40 minutes on the 400 L of aqueous dispersion using a disk refiner in the form of the same Model SDR14 Labo Refiner (pressurized DISK type) as that used in Example 1 at a disk clearance of 0.8 mm to obtain a beaten slurry having a CSF value of 90 ml↓. Papermaking was carried out using the same procedure as Example 1 at a designed basis weight of 40 g/m² followed by press treatment and drying to obtain a paper sample composed of natural cellulose fibers. Calendering treatment was carried out on the paper under the same calendering treatment conditions as those described in Example 3 to obtain a sample R4 (Comparative Example 4). Hydrophilic treatment was then carried out on R4 under the same lithium chloride coating conditions as described in Example 11 to obtain a sample R5 (Comparative Example 5) uniformly coated with lithium chloride in an amount of 1 g/m². Although both R4 and R5 had adequate strength as a result of having tensile strengths of 1.6 kg/15 mm, the results indicated in the following Table 2 were obtained when evaluated for suitability for use as energy recovery ventilation sheets. R4 was unable to realize high permeability resistance or high moisture permeability (low permeability resistance), and although R5, in which permeability resistance increased slightly as a result of coating with lithium chloride, demonstrated high moisture permeability due to the effects of the humidifying agent, moisture permeability following high-temperature hysteresis decreased considerably, resulting in problems of terms of durability as well. Namely, both samples were clearly determined to be inferior to each of the samples indicated in the aforementioned Examples 1 to 20 in terms of suitability for use as energy recovery ventilation sheets.

and comparatively high thermal conductivity, it can be preferably used as a partitioning material (energy recovery ventilation element) for energy recovery ventilators for office air-conditioners and energy recovery ventilators for home use. In addition, in the case of using as an energy recovery ventilation sheet, the multilayered structure of the present invention not only demonstrates superior permeability resistance, moisture permeability and thermal conductivity, but also demonstrates superior durability, and by using this sheet in an energy recovery ventilator, a energy recovery ventilator can be provided that demonstrates extremely high humidity exchange effectiveness and total energy recovery effectiveness over a long period of time.

The invention claimed is:

1. An energy recovery ventilation sheet composed of the multilayered structure comprising at least one fine cellulose fiber nonwoven fabric layer composed of fine cellulose fibers, wherein said fine cellulose fibers that form the fine cellulose fiber nonwoven fabric layer have a mean fiber diameter of 0.005 μm to 0.5 μm, said multilayered structure has a mean thickness of 10 μm to 200 μm, a density of 0.10 g/cm³ to 0.90 g/cm³, and an air permeability resistance of 2000 s/00 ml or more, wherein the total sum of the basis weight of the fine cellulose fiber nonwoven fabric layer is 1 g/m² to 15 g/m² and the total sum of the thickness is 0.5 μm to 15 μm.

2. The energy recovery ventilation sheet according to claim 1, wherein the mean thickness of the multilayered structure is 10 μm to 70 μm.

3. The energy recovery ventilation sheet according to claim 2, wherein the mean thickness of the multilayered structure is 10 μm to 30 μm.

TABLE 2

| | Basis weight* g/m² | Mean fiber diameter** μm | Thickness μm | Density*** g/cm³ | Permeability resistance sec/100 ml | Moisture permeability (initial) g/m²/24 hr | Moisture permeability (after high-temperature hysteresis) g/m²/24 hr | Thermal conductivity W/m/K |
|---|---|---|---|---|---|---|---|---|
| Comparative Example 1 | 20 | — | 38 | 0.526 | 0.18 × 10⁴ | 3.9 × 10³ | 3.8 × 10³ | 0.030 |
| Comparative Example 2 | 20 | — | 32 | 0.625 | 0.32 × 10⁴ | 7.0 × 10³ | 7.0 × 10³ | 0.041 |
| Comparative Example 3 | 15 + 15 + 15 | 6.6 | 110 | 0.409 | 0.01 × 10⁴ | 3.7 × 10³ | 3.6 × 10³ | 0.036 |
| Comparative Example 4 | 40 | 14 | 43 | 0.930 | 0.28 × 10⁴ | 5.2 × 10³ | 5.1 × 10³ | 0.029 |
| Comparative Example 5 | 40 | 14 | 45 | 0.933 | 0.32 × 10⁴ | 7.3 × 10³ | 5.6 × 10³ | 0.033 |

*Basis weight of each layer indicated as A + B in the case of a double layered sheet.
**Refers to mean fiber diameter of fibers composing single layer of non-woven fabric or paper.
***Density as calculated from overall basis weight, including various treatment agents.

An energy recovery ventilation element was fabricated by laminating the energy recovery ventilation sheet S17 obtained in Example 17 and shot-molded glazed kraft paper (Shiroyama Paper Co., Ltd., basis weight: 65 g/m²) followed by fabricating an orthogonal flow type static total heat exchanger (190 mm×190 mm×350 mm, 134 stages). When heat exchange rate was measured in compliance with JIS B 8626, energy recovery effectiveness was 81%.

INDUSTRIAL APPLICABILITY

Since the multilayered structure of the present invention has high permeability resistance, high moisture permeability 4. The energy recovery ventilation sheet according to claim 1, wherein the multilayered structure has been subjected to flame retardation treatment.

5. The energy recovery ventilation sheet according to claim 1, wherein the proportion of cellulose fibers in the material that composes the multilayered structure is 90% by weight or more.

6. An energy recovery ventilation element comprising an energy recovery ventilation sheet according to claim 1 used as a partitioning material that partitions two types of air flow of different temperature, humidity or both.

7. An energy recovery ventilator comprising the energy recovery ventilation element according to claim 6.

8. An energy recovery ventilation sheet according to claim 1, wherein the multilayered structure is a two-layer structure, the mean thickness of the multilayered structure is 10 μm to 150 μm, the density is 0.30 g/cm$^3$ to 0.80 g/cm$^3$ and the air permeability resistance is 3000 s/100 ml or more.

9. An energy recovery ventilation sheet according to claim 1, wherein the proportion of fine cellulose fibers contained in the fine cellulose fiber nonwoven fabric layer is 50% by weight to 100% by weight.

10. An energy recovery ventilation sheet according to claim 1, wherein one layer of the multilayered structure is a nonwoven fabric layer and/or porous film and/or fabric composed of one or a combination of a plurality of fibers selected from the group of regenerated cellulose fibers, natural cellulose fibers, nylon fibers, polyester fibers and polyolefin fibers.

11. An energy recovery ventilation sheet according to claim 10, wherein said one layer of the multilayered structure is a nonwoven fabric layer composed of regenerated cellulose continuous long fibers.

12. An energy recovery ventilation sheet according to claim 1, wherein the multilayered structure has been subjected to waterproofing treatment.

13. An energy recovery ventilation sheet according to claim 1, wherein the multilayered structure has been subjected to hydrophilic treatment.

* * * * *